United States Patent
Romero et al.

(10) Patent No.: US 12,518,850 B2
(45) Date of Patent: Jan. 6, 2026

(54) SYSTEMS AND METHODS FOR FULLY AUTOMATED PROTEIN ENGINEERING

(71) Applicant: Wisconsin Alumni Research Foundation, Madison, WI (US)

(72) Inventors: Philip Anthony Romero, Madison, WI (US); Bennett James Bremer, Madison, WI (US); Jacob Thomas Rapp, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1478 days.

(21) Appl. No.: 17/018,274

(22) Filed: Sep. 11, 2020

(65) Prior Publication Data
US 2021/0074377 A1 Mar. 11, 2021

Related U.S. Application Data

(60) Provisional application No. 62/898,931, filed on Sep. 11, 2019.

(51) Int. Cl.
*G16B 15/00* (2019.01)
*G16B 40/00* (2019.01)

(52) U.S. Cl.
CPC .............. *G16B 15/00* (2019.02); *G16B 40/00* (2019.02)

(58) Field of Classification Search
CPC ........ G16B 15/00; G16B 40/00; G16B 40/20; C12N 15/1027; C12N 15/1089; C40B 40/08
See application file for complete search history.

(56) References Cited

U.S. PATENT DOCUMENTS

2019/0284588 A1 9/2019 Pfleger et al.

OTHER PUBLICATIONS

Z. Wu, S.B.J. Kan, R.D. Lewis, B.J. Wittmann, & F.H. Arnold, Machine learning-assisted directed protein evolution with combinatorial libraries, Proc. Natl. Acad. Sci. U.S.A. 116 (18) 8852-8858, (2019). (Year: 2019).*
Conway P, Tyka MD, DiMaio F, Konerding DE, Baker D. *Relaxation of backbone bond geometry improves protein energy landscape modeling.* Protein Sci. Jan. 2014;23(1):47-55.
Engler C, Kandzia R, Marillonnet S. *A one pot, one step, precision cloning method with high throughput capability.* PLoS One. 2008;3(11):e3647, 7 pages.

(Continued)

*Primary Examiner* — Larry D Riggs, II
*Assistant Examiner* — Emilie A Neulen
(74) *Attorney, Agent, or Firm* — Daniel A. Blasiole; DeWitt LLP

(57) ABSTRACT

Systems and methods for protein engineering. The systems include a sequence testing subsystem and a machine learning subsystem. The sequence testing subsystem is configured to express proteins and test the expressed proteins for a given property. The machine learning subsystem is configured to model the activities of a set of possible proteins in light of the properties of the tested proteins and provide one or more untested proteins in the set to the sequence testing subsystem for subsequent testing. The system can be run in an iterative fashion and be fully automated. Methods of using the systems are provided.

20 Claims, 17 Drawing Sheets
(16 of 17 Drawing Sheet(s) Filed in Color)

Specification includes a Sequence Listing.

(56) References Cited

OTHER PUBLICATIONS

Li Y, Drummond DA, Sawayama AM, Snow CD, Bloom JD, Arnold FH. A diverse family of thermostable cytochrome P450s created by recombination of stabilizing fragments. Nat Biotechnol. Sep. 2007;25(9):1051-6.

Potapov V, Ong JL, Kucera RB, Langhorst BW, Bilotti K, Pryor JM, Cantor EJ, Canton B, Knight TF, Evans TC Jr., Lohman GJS. Comprehensive Profiling of Four Base Overhang Ligation Fidelity by T4 DNA Ligase and Application to DNA Assembly. ACS Synth Biol. Nov. 16, 2018;7(11):2665-2674.

Rasmussen CE and Williams CKI, *Gaussian Processes for Machine Learning*, the MIT Press, 2006, ISBN 026218253X (www.GaussianProcess.org), particularly Chapters 2 and 3, 266 pages.

Voigt CA, Martinez C, Wang ZG, Mayo SL, Arnold FH. Protein building blocks preserved by recombination. Nat Struct Biol. Jul. 2002;9(7):553-8.

\* cited by examiner

SYSTEMS AND METHODS FOR FULLY AUTOMATED PROTEIN ENGINEERING

STATEMENT REGARDING FEDERALLY SPONSORED RESEARCH

This invention was made with government support under GM119854 awarded by the National Institutes of Health. The government has certain rights in the invention.

BACKGROUND

Conventional protein engineering is a difficult, laborious endeavor. Protein engineering typically involves designing a proposed protein for testing and then functionally testing the proposed protein. The protein design process typically involves either random sampling or guesswork, neither of which carries a high probability of success. The protein testing process typically involves DNA assembly, transformation, plating/culturing, miniprepping, DNA sequencing, protein expression, purification, and functional assays, which are collectively laborious and time consuming.

Machine learning and artificial intelligence (AI) are transforming marketing, finance, healthcare, security, manufacturing, transportation, and nearly every aspect of daily life. These approaches leverage vast amounts of data to find patterns and quickly make optimal decisions.

Systems and methods for protein engineering that harness the computational power of machine learning and AI while streamlining the protein testing process are needed.

SUMMARY OF THE INVENTION

In a particular embodiment, the present invention provides an AI-driven robotic system that can automatically engineer proteins with new or enhanced properties. This robotic system can use reinforcement learning (the program takes actions to maximize some sort of cumulative reward) and upper confidence bound algorithms to optimize the genotype-phenotype pairing of interest. The system tests the hypothetical sequences designed by the program using a robotic unit that automates liquid handling and detection. The results of these experiments are fed back into the program, the algorithms run with the new input, and another set of experiments is designed and implemented.

With minimal human input at the beginning of the process, the system provided herein can automatically create genetic sequences for optimizing any phenotype, design experiments, carry out those experiments, and learn from the output of those experiments. While a lab tech can only work a set amount of time, this system can run around the clock, and there would be no human error in the data analysis or performance of the experiments.

Exemplary aspects of the invention are provided in FIGS. 1-3.

One aspect of the invention is directed to protein engineering systems.

One exemplary system comprises a sequence testing subsystem and a machine learning subsystem.

An exemplary sequence testing subsystem comprises nucleic acid fragments capable of being combined in different combinations to generate nucleic acids encoding a set of different possible proteins. The sequence testing subsystem further comprises a nucleic acid assembly subsystem configured to assemble the nucleic acids from the nucleic acid fragments. The sequence testing subsystem further comprises a protein expression subsystem configured to express proteins from the nucleic acids and thereby generate expressed proteins. The sequence testing subsystem further comprises a property detector subsystem configured to detect property values of the expressed proteins for a given property and thereby generate detected property values corresponding to the expressed proteins.

An exemplary machine learning subsystem comprises a server. The machine learning subsystem is configured to receive the detected property values from the sequence testing subsystem. The machine learning subsystem is further configured to predict, from the detected property values received from the sequence testing subsystem, predicted property values for untested proteins. The untested proteins comprise possible proteins in the set that do not have corresponding detected property values. The machine learning subsystem is further configured to select one or more of the untested proteins based on the predicted property values to thereby generate one or more selected proteins. The machine learning subsystem is further configured to instruct the sequence testing subsystem to test the one or more selected proteins to obtain a detected property value therefor.

In some versions, the sequence testing subsystem further comprises a robot configured to combine the nucleic acid fragments in the nucleic acid assembly subsystem, introduce the nucleic acids to the protein expression subsystem, and introduce the expressed proteins to the property detector subsystem.

In some versions, the sequence testing subsystem further comprises an amplification subsystem configured to amplify the nucleic acids. In some versions, the sequence testing subsystem further comprises an amplification subsystem configured to amplify the nucleic acids and a robot configured to combine the nucleic acid fragments in the nucleic acid assembly subsystem, introduce the nucleic acids to the amplification subsystem, introduce the nucleic acids to the protein expression subsystem, and introduce the expressed proteins to the property detector subsystem. In some versions, the sequence testing subsystem is configured to express the proteins from the nucleic acids in the protein expression subsystem after amplifying the nucleic acids in the amplification subsystem without purifying the nucleic acids. In some versions, the sequence testing subsystem is configured to dilute the nucleic acids by a dilution factor of 6-60 without purifying the nucleic acids after amplifying the nucleic acids in the amplification subsystem and before expressing the proteins from the nucleic acids in the protein expression subsystem.

In some versions, the sequence testing subsystem further comprises a control capable of being combined with a sample of each of the expressed proteins, is configured to split each sample of the expressed proteins combined with the control into corresponding first and second samples prior to detecting the property values of the expressed proteins, and is configured to detect the property value from the expressed protein in each of the first samples, detect a control value in each of the second samples, and normalize the detected property value from each first sample to the detected control value in each corresponding second sample.

In some versions, at least one of the machine learning subsystem being configured to predict the predicted property values and the machine learning subsystem being configured to select the one or more of the untested proteins comprises modeling at least a subset of the detected property values and the untested proteins in a Gaussian process regression model.

In some versions, at least one of the machine learning subsystem being configured to predict the predicted property values and the machine learning subsystem being configured to select the one or more of the untested proteins comprises employing a multi-armed bandit algorithm. In some versions, the multi-armed bandit algorithm comprises at least one of an upper confidence bound algorithm and a Thompson sampling algorithm.

In some versions, at least one of the machine learning subsystem being configured to predict the predicted property values and the machine learning subsystem being configured to select the one or more of the untested proteins comprises: ignoring any detected property values equaling zero when predicting the predicted property values for the untested proteins; assigning a property value of a predefined non-zero constant to each of the expressed proteins corresponding to a detected property value of zero when predicting the predicted property values for the untested proteins; restricting the selected proteins to a set of the untested proteins having a predicted property value greater than a predefined threshold; or predicting a predicted property likelihood for each of the possible proteins in the set, minimum-subtracting an upper confidence bound in an upper confidence bound algorithm or a predicted property value in a Thompson sampling algorithm to generate a minimum-subtracted value for each of the possible proteins in the set, multiplying each minimum-subtracted value by each predicted property likelihood to generate a product for each of the possible proteins in the set, and employing the product as an upper confidence bound or distribution mean for selecting the one or more of the untested proteins.

In some versions, the number of the different possible proteins in the set is greater than 200. In some versions, all of the possible proteins in the set comprise amino acid sequences that have at least 60% sequence identity to each other.

In some versions, the system comprises separately contained sets of the nucleic acid fragments, wherein each nucleic acid fragment in each set of nucleic acid fragments encodes an identical amino acid sequence. In some versions, the nucleic acid fragments within each set of nucleic acid fragments are configured not to be mutually assembled together with the nucleic acid assembly subsystem. In some versions, the nucleic acid fragments in each set of nucleic acid fragments are configured to assemble with the nucleic acid fragments in each of at least two other of the sets of nucleic acid fragments. In some versions, the nucleic acid fragments in each set of nucleic acid fragments are configured not to assemble with the nucleic acid fragments in each of at least two other of the sets of nucleic acid fragments.

In some versions, the nucleic acid fragments are configured to assemble in different ordered combinations. In some versions, the nucleic acid fragments are configured to assemble the nucleic acids using from 3 to 30 nucleic acid fragments per nucleic acid. In some versions, each nucleic acid fragment is from 10 to 600 bases in length. In some versions, the nucleic acid fragments are configured to assemble the nucleic acids using from 2 to 30 assembly points. In some versions, at least one of the nucleic acid fragments overlaps an assembly point of at least one other of the nucleic acid fragments. In some versions, at least some of the nucleic acid fragments consist of natural nucleic acid sequences. In some versions, at least some of the nucleic acid fragments have unnatural nucleic acid sequences.

In some versions, the property of the expressed proteins comprises one or more of binding activity, enzymatic activity, fluorescence, thermostability, and solubility.

In some versions, the sequence testing subsystem comprises multiple sequence testing subsystems, and each of the multiple sequence testing subsystems comprises its own independent nucleic acid assembly subsystem, protein expression subsystem, and property detector subsystem. In some versions, the multiple sequence testing subsystems are each independently connected to the server via a wireless network.

Another aspect of the invention is directed to methods of protein engineering. Any of such methods can be employed on a system of the invention.

One exemplary method comprises conducting a number of steps in a sequence testing subsystem. These steps include assembling, in a nucleic acid assembly subsystem, nucleic acids from nucleic acid fragments to generate nucleic acids encoding a set of different possible proteins; expressing, in a protein expression subsystem, proteins from the nucleic acids to thereby generate expressed proteins; detecting, in a property detector subsystem, property values of the expressed proteins; and determining, in a machine learning subsystem, all possible nucleic acid sequences of the nucleic acids capable of being assembled from the nucleic acid fragments, thereby generating detected property values corresponding to the expressed proteins. Further steps can be conducted in a machine learning subsystem. These steps include receiving the detected property values from the sequence testing subsystem; predicting, from the detected property values received from the sequence testing subsystem, predicted property values for untested proteins, wherein the untested proteins comprise possible proteins in the set that do not have corresponding detected property values; selecting one or more of the untested proteins based on the predicted property values to thereby generate one or more selected proteins; and instructing the sequence testing subsystem to test the one or more selected proteins to obtain a detected property value therefor. Each of the assembling, the expressing, the detecting, the determining, the receiving, the predicting, the selecting, and the instructing can be performed in an automated, computer-controlled system.

In some methods, a robot combines the nucleic acid fragments in the nucleic acid assembly subsystem, introduces the nucleic acids to the protein expression subsystem, and introduces the expressed proteins to the property detector subsystem.

Some methods further comprise, after the assembling and prior to the expressing, amplifying the nucleic acids. The nucleic acids can be amplified in an amplification subsystem. In some methods, a robot combines the nucleic acid fragments in the nucleic acid assembly subsystem, introduces the nucleic acids to the amplification subsystem, introduces the nucleic acids to the protein expression subsystem, and introduces the expressed proteins to the property detector subsystem. In some methods, expressing the proteins is performed after amplifying the nucleic acids in the amplification subsystem without purifying the nucleic acids. In some versions, the nucleic acids are diluted by a dilution factor of 6-60 without purifying the nucleic acids after amplifying the nucleic acids and before expressing the proteins from the nucleic acids.

Some methods comprise combining a control with a sample of each of the expressed proteins, splitting each sample of the expressed proteins combined with the control into corresponding first and second samples prior to detecting the property values of the expressed proteins, detecting the property value from the expressed protein in each of the first samples, detecting a control value in each of the second samples, and normalizing the detected property value from each first sample to the detected control value in each corresponding second sample.

In some methods, at least one of the predicting and the selecting comprises modeling at least a subset of the detected property values and the untested proteins in a Gaussian process regression model.

In some methods, at least one of the predicting and the selecting comprises employing a multi-armed bandit algorithm. In some methods, the multi-armed bandit algorithm comprises at least one of an upper confidence bound algorithm and a Thompson sampling algorithm.

In some methods, at least one of the at least one of the predicting and the selecting comprises ignoring any detected property values equaling zero when predicting the predicted property values for the untested proteins; assigning a property value of a predefined non-zero constant to each of the expressed proteins corresponding to a detected property value of zero when predicting the predicted property values for the untested proteins; restricting the selected proteins to a set of the untested proteins having a predicted property value greater than a predefined threshold; or predicting a predicted property likelihood for each of the possible proteins in the set, minimum-subtracting an upper confidence bound in an upper confidence bound algorithm or a predicted property value in a Thompson sampling algorithm to generate a minimum-subtracted value for each of the possible proteins in the set, multiplying each minimum-subtracted value by each predicted property likelihood to generate a product for each of the possible proteins in the set, and employing the product as an upper confidence bound or distribution mean for selecting the one or more of the untested proteins.

In some methods, the number of the different possible proteins in the set is greater than 200. In some methods, all of the possible proteins in the set comprise amino acid sequences that have at least 60% sequence identity to each other.

In some methods, the nucleic acid fragments are separately contained in sets of nucleic acid fragments prior the assembling, wherein each nucleic acid fragment in each set of nucleic acid fragments encodes an identical amino acid sequence. In some methods, the nucleic acid fragments within each set of nucleic acid fragments are configured not to be mutually assembled together. In some methods, the nucleic acid fragments in each set of nucleic acid fragments are configured to assemble with the nucleic acid fragments in each of at least two other of the sets of nucleic acid fragments. In some methods, the nucleic acid fragments in each set of nucleic acid fragments are configured not to assemble with the nucleic acid fragments in each of at least two other of the sets of nucleic acid fragments.

In some methods, the nucleic acid fragments are configured to assemble in different ordered combinations. In some methods, the nucleic acid fragments are configured to assemble the nucleic acids using from 3 to 30 nucleic acid fragments per nucleic acid. In some methods, each nucleic acid fragment is from 10 to 600 bases in length. In some methods, the nucleic acid fragments are configured to assemble the nucleic acids using from 2 to 30 assembly points. In some methods, at least one of the nucleic acid fragments overlaps an assembly point of at least one other of the nucleic acid fragments. In some methods, at least some of the nucleic acid fragments consist of natural nucleic acid sequences. In some methods, at least some of the nucleic acid fragments have unnatural nucleic acid sequences.

In some methods, the property of the expressed proteins comprises one or more of binding activity, enzymatic activity, fluorescence, thermostability, and solubility.

In some methods, the sequence testing subsystem comprises multiple sequence testing subsystems, and each of the multiple sequence testing subsystems comprises its own independent nucleic acid assembly subsystem, protein expression subsystem, and property detector subsystem. In some methods, the multiple sequence testing subsystems are each independently connected to the server via a wireless network.

The systems and methods provided herein drastically reduce the number of steps going from sequence to data. A number of steps in the traditional characterization pipeline can be streamlined or eliminated. Such steps might include transformation, plating/culturing, miniprepping, DNA sequencing, and protein purification. It is surprising that such steps can be eliminated and still generate high quality data.

An important aspect of the invention is automating the design-test-learn cycle. This involves more than just simplifying the experimental aspects, as it integrates the design-test-learn cycle in an automated process.

The objects and advantages of the invention will appear more fully from the following detailed description of the preferred embodiment of the invention made in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 10A shows results from a first run in which a robot ran continuously for 10 days with no given initial data. Active sequence 6111 was discovered on day 5 of the experiment. FIG. 10B shows results from a second run in which the robot ran six experiments in pairs. Of the six experiments, two were the result of failed expression and were excluded.

DETAILED DESCRIPTION OF THE INVENTION

Figure 1:
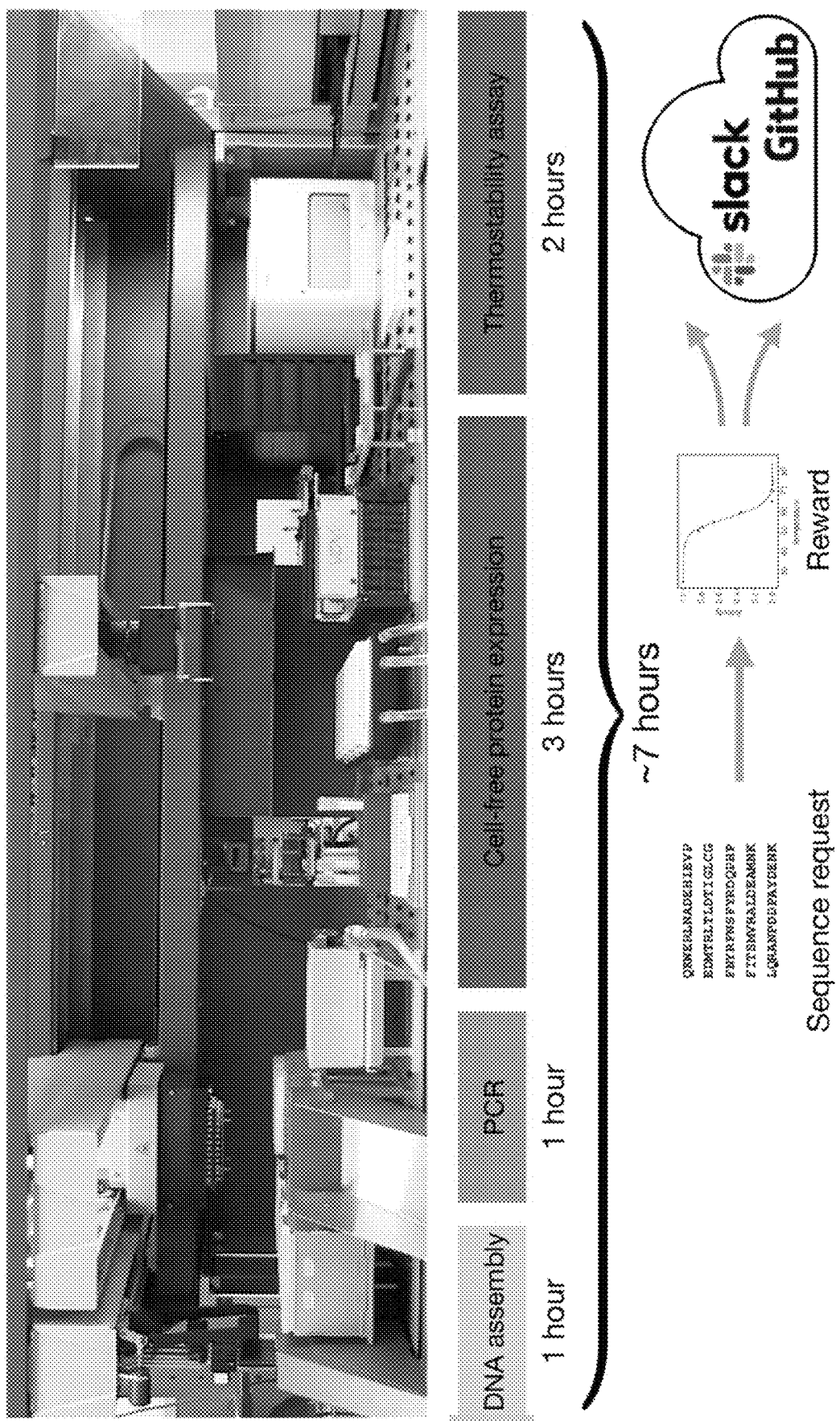
FIG. 1 shows an exemplary fully automated sequence testing system of the invention.
Figure 2:
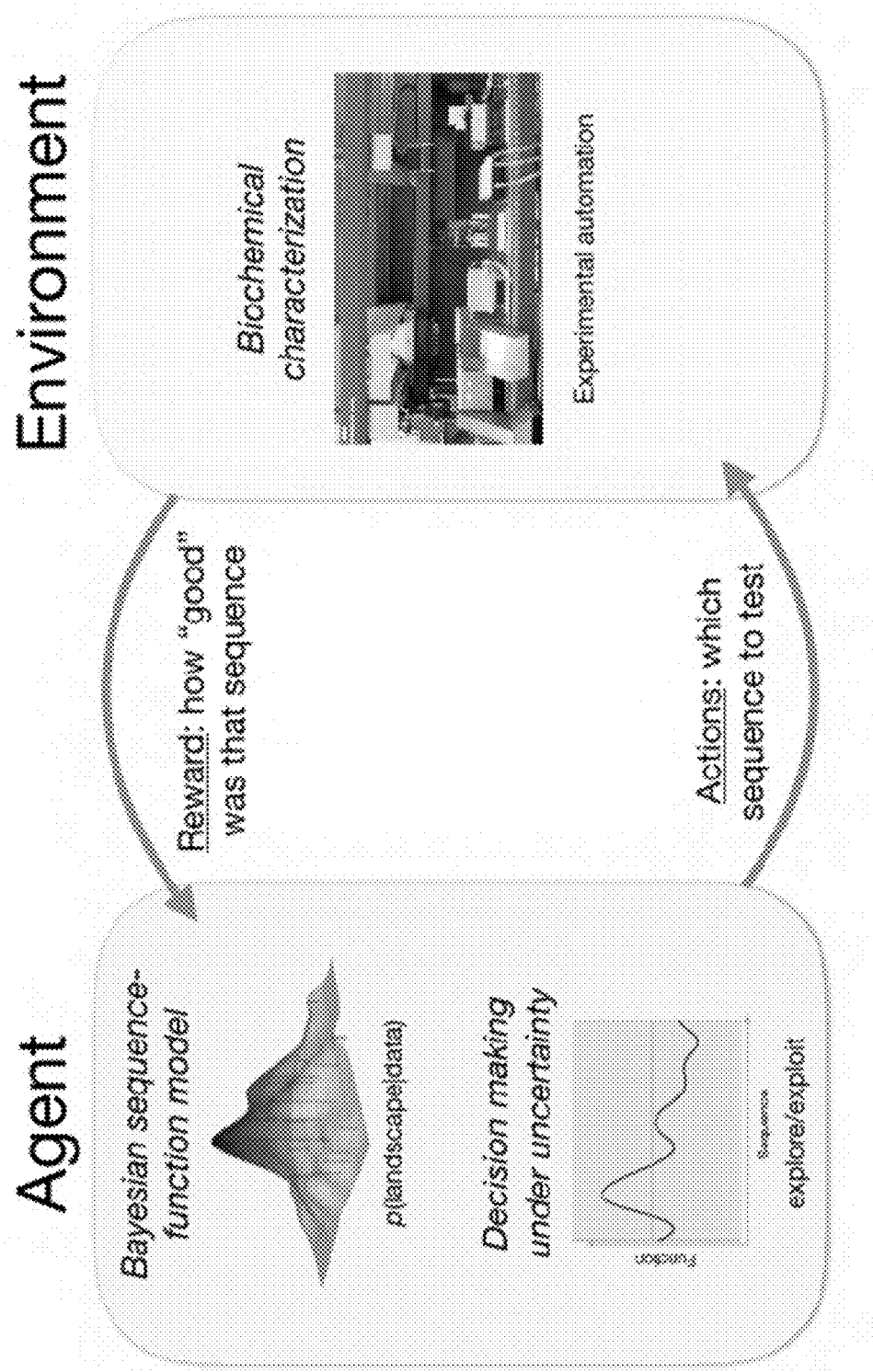
FIG. 2 shows a schema of interactions between an exemplary machine learning subsystem (component) (shown as "agent") of the invention and an exemplary sequence testing system of the invention (shown as "environment").

The nucleic acid fragments of the invention are fragments of nucleic acids such as DNA that are capable of assembling into nucleic acids having different pre-determined sequences. The term "fragment" is meant to be understood insofar as each fragment has a portion of the pre-determined sequences of one of the nucleic acids. The nucleic acid fragments may be provided in linear or circular form and may have additional nucleic acids appended thereto. The nucleic acid fragments can be single or double-stranded. If double stranded, the nucleic acid fragments can have two sticky ends, one sticky end and one blunt end, or two blunt ends. If additional nucleic acids are appended to a given nucleic acid fragment, only those nucleic acids that are assembled into the nucleic acid itself are considered to be part of the nucleic acid fragment.

The nucleic acid fragments may have any length suitable for assembling into a nucleic acid. Such lengths include from 1 to 6,000 or more bases. In some versions of the invention, the nucleic acid fragments have a length of at least 1, at least 5, at least 10, at least 25, at least 50, at least 100, at least 200, at least 300 at least 400, at least 500, at least 600, at least 700, at least 800, at least 900, or at least 1,000 bases. In some versions of the invention, the nucleic acid fragments have a length up to 5, up to 10, up to 25, up to 50, up to 100, up to 200, up to 300 up to 400, up to 500, up to 600, up to 700, up to 800, up to 900, up to 1,000, up to 1,500, up to 2,000, up to 2,500, up to 3,000, up to 3,500, up to 4,000, up to 4,500, up to 5,000, up to 5,500, up to 6,000 bases or more.

The nucleic acid fragments are configured to assemble the nucleic acids using any number of nucleic acid fragments per nucleic acid. The number of nucleic acid fragments is limited in part, on the size of the nucleic acids and the sizes of the nucleic acid fragments capable of assembling to form the nucleic acids. Suitable numbers of nucleic acid fragments include from 2 to 6,000 or more nucleic acid fragments per nucleic acid. In some versions of the invention, the nucleic acid fragments are configured for at least 2, at least 3, at least 4, at least 5, at least 10, at least 25, at least 50, at least 100, at least 200, at least 300 at least 400, at least 500, at least 600, at least 700, at least 800, at least 900, or at least 1,000 nucleic acid fragments to assemble to form each nucleic acid. In some versions of the invention, the nucleic acid fragments are configured for up to 5, up to 10, up to 25, up to 50, up to 100, up to 200, up to 300 up to 400, up to 500, up to 600, up to 700, up to 800, up to 900, up to 1,000, up to 1,500, up to 2,000, up to 2,500, up to 3,000, up to 3,500, up to 4,000, up to 4,500, up to 5,000, up to 5,500, up to 6,000, or more nucleic acid fragments to assemble to form each nucleic acid.

The nucleic acid fragments are configured to assemble the nucleic acids using any number of assembly points. An assembly point is the position in the final nucleic acid in which one nucleic acid fragment assembles with another. The assembly points can correspond with the breakpoints used in designing the nucleic acid fragments from parent nucleic acids (see, e.g., the following examples). The number of assembly points used to assemble the nucleic acids from the nucleic acid fragments is limited in part, on the size of the nucleic acids and the sizes of the nucleic acid fragments capable of assembling to form the nucleic acids. Suitable numbers of assembly points used to form a nucleic acid include from 1 to 6,000 or more assembly points per nucleic acid. In some versions of the invention, the nucleic acid fragments are configured to form the nucleic acids with at least 2, at least 3, at least 4, at least 5, at least 10, at least 25, at least 50, at least 100, at least 200, at least 300 at least 400, at least 500, at least 600, at least 700, at least 800, at least 900, or at least 1,000 assembly points per nucleic acid. In some versions of the invention, the nucleic acid fragments are configured to form the nucleic acids with up to 5, up to 10, up to 25, up to 50, up to 100, up to 200, up to 300 up to 400, up to 500, up to 600, up to 700, up to 800, up to 900, up to 1,000, up to 1,500, up to 2,000, up to 2,500, up to 3,000, up to 3,500, up to 4,000, up to 4,500, up to 5,000, up to 5,500, up to 6,000, or more assembly points per nucleic acid.

Figure 4:
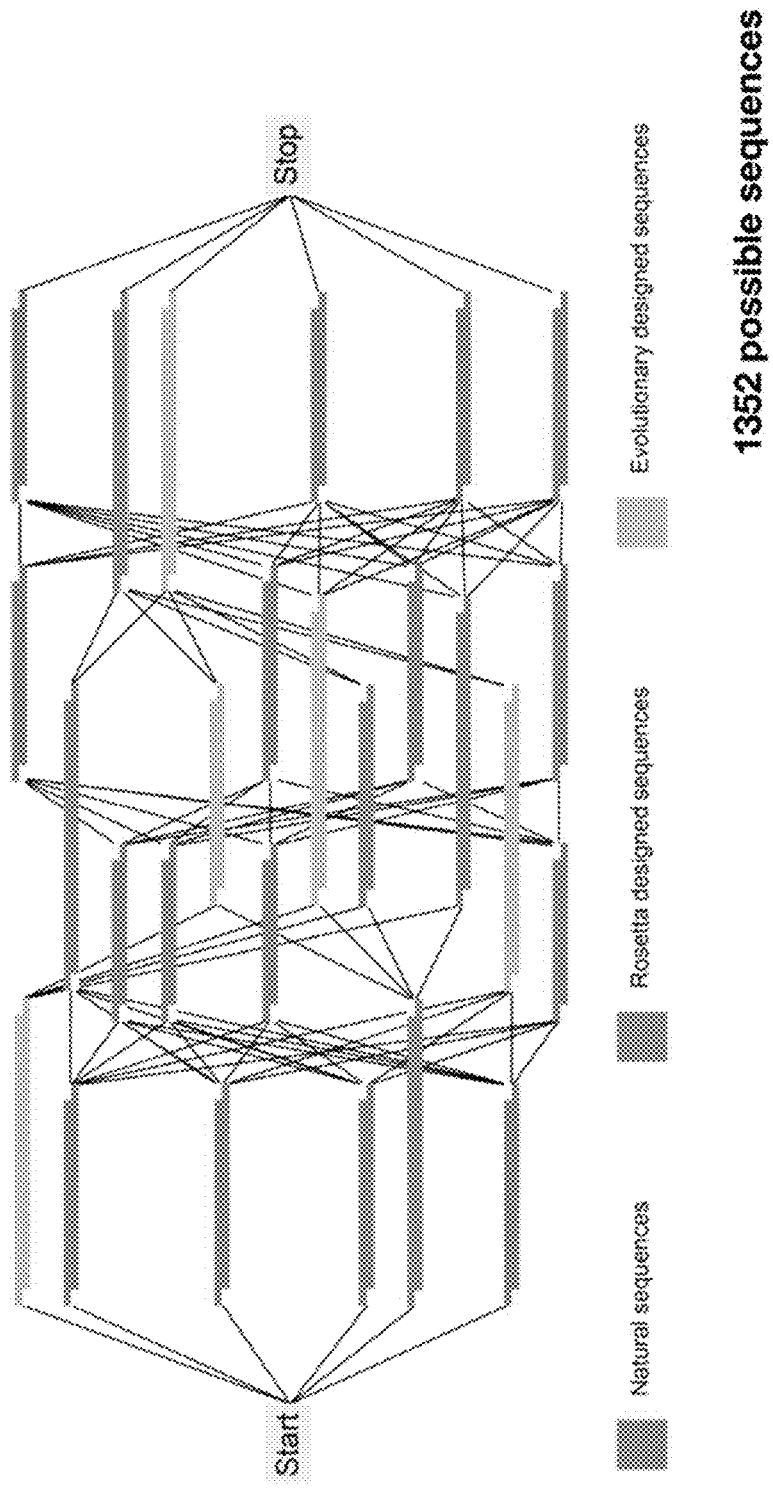
FIG. 4 shows a schema of the nucleic acid fragments and their possible connectivities for assembling complete reading frames.

In some versions of the invention, one or more nucleic acid fragments overlap one or more assembly points of one or more other nucleic acid fragments. Examples of such overlap are shown in FIG. 4, wherein each Rosetta and evolutionary nucleic acid fragment overlaps the assembly points of a number of natural nucleic acid fragments and each natural sequence nucleic acid fragment overlaps the assembly points of a number of Rosetta and evolutionary nucleic acid fragments. In some versions of the invention, one, some, or all of the nucleic acid fragments overlap an assembly point of at least 1, at least 2, at least 3, at least 4, at least 5, at least 6, at least 7, at least 8, at least 9, at least 10, at least 15, at least 20, at least 25 or more other nucleic acid fragments. In some versions of the invention, one, some, or all of the nucleic acid fragments overlap an assembly point of up to 2, up to 3, up to 4, up to 5, up to 6, up to 7, up to 8, up to 9, up to 10, up to 15, up to, up to 25, up to 50, or more other nucleic acid fragments.

The nucleic acid fragments are preferably configured to be capable of generating nucleic acids encoding a large number of different possible proteins. "Different" in this context refers to having a different amino acid sequence (e.g., having one or more substitutions, indels, truncations, etc.) "Possible" in this context refers to a protein that can be generated from various combinations of the given nucleic acid fragments present in a particular system. The number of different possible proteins will be a function, in part, of the number of unique nucleic acid fragments that can assemble to form the nucleic acids, the number of assembly points, the connectivities of the nucleic acid fragments, and other factors. In some versions of the invention, the number of different possible proteins capable of being generated from the nucleic acid fragments is at least 10, at least 50, at least 100, at least 200, at least 500, at least 750, at least 1,000, at least 1,250, at least 1,500, at least 2,000, at least 3,000, at least 4,000, at least 5,000, or more. In some versions of the invention, the number of different possible proteins capable of being generated from the nucleic acid fragments is up to 50, up to 100, up to 200, up to 500, up to 750, up to 1,000, up to 1,250, up to 1,500, up to 2,000, up to 3,000, up to 4,000, up to 5,000, up to 6,000, up to 7,000, up to 8,000, up to 9000, up to 10,000, or more.

In various versions of the invention, all of the possible proteins in the set of possible proteins comprise amino acid sequences that have at least 5% sequence identity, at least 10% sequence identity, at least 15% sequence identity, at least 20% sequence identity, at least 25% sequence identity, at least 30% sequence identity, at least 35% sequence identity, at least 40% sequence identity, at least 45% sequence identity, at least 50% sequence identity, at least 55% sequence identity, at least 60% sequence identity, at least 65% sequence identity, at least 70% sequence identity, at least 75% sequence identity, at least 80% sequence identity, at least 85% sequence identity, at least 90% sequence identity, or at least 95% sequence identity to each other. See US 2019/0284588 for an applicable definition of percent sequence identity and methods for determining same.

In some versions of the invention, the nucleic acid fragments are separately contained in sets of the nucleic acid fragments before being assembled into the nucleic acids. The separately contained nucleic acid fragments can be contained in separate well, separate tubes, or any other container that prevents mixing of the different sets. Each nucleic acid fragment in each set of nucleic acid fragments are preferably identical to each other or at least encode an identical amino acid sequence. This facilitates the ability to generate proteins with a known amino acid sequence from the nucleic acids, and ultimately, the nucleic acid fragments. "Identical" in this context refers to sequences that have 100% sequence identity to each other.

The nucleic acid fragments can be configured with a number of connectivities. "Connectivity" refers to the ability of a particular nucleic acid fragment to assemble with another particular nucleic acid fragment at a given assembly point. In some versions, the nucleic acid fragments within each of the sets are configured not to be mutually assembled together with the nucleic acid assembly subsystem. In some versions, the nucleic acid fragments in each of the sets are configured to assemble with the nucleic acid fragments in at least 2 other of the sets, at least 3 other of the sets, at least 4 other of the sets, at least 5 other of the sets, at least 10 other of the sets, at least 15 other of the sets, at least 20 other of the sets, at least 50 other of the sets, or more. In some versions, the nucleic acid fragments in each of the sets are configured not to assemble with the nucleic acid fragments in at least 2 other of the sets, at least 3 other of the sets, at least 4 other of the sets, at least 5 other of the sets, at least 10 other of the sets, at least 15 other of the sets, at least 20 other of the sets, at least 50 other of the sets, or more. Nucleic acid fragments can be configured to assemble, in at least some versions of the invention, by having or being configured to form complementary sticky ends. Nucleic acid fragments can be configured not to assemble, in at least some versions of the invention, by having or being configured to form non-complementary sticky ends.

The total number of sets of nucleic acid fragments in some versions of the invention can be at least at least 2, at least 3, at least 4, at least 5, at least 10, at least 25, at least 50, at least 100, at least 200, at least 300 at least 400, at least 500, at least 600, at least 700, at least 800, at least 900, or at least 1,000 sets. The total number of sets of nucleic acid fragments in some versions of the invention can be up to 5, up to 10, up to 25, up to 50, up to 100, up to 200, up to 300 up to 400, up to 500, up to 600, up to 700, up to 800, up to 900, up to 1,000, up to 1,500, up to 2,000, up to 2,500, up to 3,000, up to 3,500, up to 4,000, up to 4,500, up to 5,000, up to 5,500, up to 6,000, or more.

The nucleic acid fragments can be configured to assemble in different particular ordered combinations. In other words, each nucleic acid fragment can be configured to assemble with only a subset of other nucleic acid fragments in particular pre-determined orders. This can be accomplished, at least one some versions of the invention, by configuring the nucleic acid fragments to have or be capable of forming sticky ends that are complementary with the sticky ends (whether present or capable of being formed) of some but not other nucleic acid fragments. See, e.g., the permissible connectivities indicated by the thin black lines in FIG. 4.

In some versions of the invention, the nucleic acid fragments comprise nucleic acid fragments consisting of natural nucleic acid sequences. "Natural nucleic acid sequences" in this context refers to nucleic acid sequences that encode a sequence comprised by a protein as found in nature. In some versions of the invention, the nucleic acid fragments comprise nucleic acid fragments consisting of unnatural nucleic acid sequences. "Unnatural nucleic acid sequences" in this context refers to nucleic acid sequences that encode a sequence that is not comprised by a protein as found in nature. In some versions of the invention, the nucleic acid fragments comprise nucleic acid fragments consisting of natural nucleic acid sequences as well as nucleic acid fragments consisting of unnatural nucleic acid sequences.

The nucleic acids generated by the nucleic acid fragments preferably comprise a protein coding sequence. The proteins encoded by the coding sequence can be or be based on any protein having any type of function. Exemplary types of proteins that can be encoded by the nucleic acids include enzymes, ligands, transcription factors, receptors, and transport proteins, among others.

The nucleic acid assembly subsystem of the invention can comprise any combination of components suitable for assembling a nucleic acid from nucleic acid fragments. "Assembly" in this context refers at least to the ionic interaction of the nucleic acid fragments to each other via base pairing and/or, preferably, the covalent bonding of the nucleic acid fragments to each other. The assembly can be performed by any method known in the art. Exemplary methods include enzymatic ligation and chemical synthesis. Methods of enzymatic ligation are provided in the examples and are otherwise known in the art. Methods of chemical synthesis of nucleic acids, such as DNA, are well known in the art. Exemplary components for a nucleic acid assembly subsystem for performing enzymatic ligation include DNA ligase, a DNA ligase buffer, and, if needed, any other reagents suitable for preparing the nucleic acid fragments for ligation.

The amplification subsystem of the invention can comprise any combination of components suitable for amplifying nucleic acids. Methods of nucleic acid amplification include PCR and isothermal amplification. A preferred method of nucleic acid amplification is PCR. Exemplary components of an amplification subsystem configured for PCR include primers, DNA polymerase, dNTPs, and a suitable PCR buffer. Isothermal methods of amplification can also be used.

The protein expression subsystem of the invention can comprise any combination of components suitable for expressing proteins from nucleic acids. The protein expression subsystem will typically comprise reagents for translation, such as ribosomes, amino acids, and tRNA, and, depending on the form of the assembled nucleic acids, reagents for transcription such as nucleotides and RNA polymerases. A preferred method of protein expression is cell-free protein expression. A number of cell-free protein expression kits are available and can be included in the protein expression subsystem of the invention.

It has been surprisingly found that the nucleic acids can be expressed after amplification without purifying the nucleic acids merely by diluting the amplified nucleic acids in the protein expression subsystem. The nucleic acids can be diluted by a factor of from about 2 to about 100 or more. In some versions, the nucleic acids are diluted by a factor of at least about 2, at least about 3, at least about 4, at least about 5, at least about 6, at least about 7, at least about 8, at least about 9, at least about 10, at least about 11, at least about 12, at least about 13, at least about 14, at least about 15, or at least about 16. In some versions, the nucleic acids are diluted by a factor up to about 8, up to about 9, up to about 10, up to about 15, up to about 20, up to about 30, up to about 40, up to about 50, up to about 60, up to about 70, up to about 80, up to about 90, up to about 100, or more. The diluent preferably is or comprises water.

The property detector subsystem of the invention can comprise any combination of components suitable for detecting a property of a protein. Exemplary properties of proteins that can be detected include binding activity, enzymatic activity, fluorescence, thermostability, and solubility, among others. The components of a particular property detector subsystem will depend on the type of property being detected. A property detector subsystem configured to detect binding activity, for example, may comprise a binding partner of the protein (e.g., a small molecule ligand, a protein ligand, etc.) and a component suitable for detecting the binding. A property detector subsystem configured to detect enzyme activity may comprise a substrate for the enzyme and a component suitable for detecting the product of the reaction. A property detector subsystem configured to detect fluorescence may comprise a light source capable of irradiating the protein at a wavelength suitable for emitting the fluorescence. A property detector subsystem configured to detect thermostability can comprise any of the foregoing components in addition to heating elements capable of heating different samples of the protein to different temperatures.

In various versions of the invention, it may be necessary or advantageous to split a sample of expressed protein into separate samples for detecting a property. It was found that variance in automated pipetting can lead to inconsistent amounts of protein in the various separate samples that can lead to artifactual results. It was further found that including a control in the sample of expressed protein, detecting the amount of control in the split, separate samples, and normalizing the detected value of the property ("property value") by the detected amount of control can resolve this issue. Accordingly, the systems and methods of the invention can comprise a control capable of being combined with a sample of each of the expressed proteins. The samples with the control can be split into corresponding first and second samples prior to detecting the property values of the expressed proteins. The property value from the expressed protein in each of the first samples can be detected, a control value in each of the second samples can be detected, and the detected property value from each first sample can be normalized to the detected control value in each corresponding second sample. The control can include any component or reagent that can be included with the expressed proteins, evenly divided when dividing the expressed proteins, and subsequently detected. Examples of preferred controls include luminescent, fluorescent, and/or radioactive molecules.

Automation of the steps performed by the subsystems outlined above can be performed by a programmable robot. The robot, for example, can be configured to combine the nucleic acid fragments in the nucleic acid assembly subsystem, introduce the nucleic acids to the amplification subsystem, introduce the nucleic acids to the protein expression subsystem, and/or introduce the expressed proteins to the property detector subsystem. The robot can include pipettors that can be directed to conduct each of the above-referenced combination and introducing steps by moving solutions or components from certain wells to others. The robot can also include other elements, such as heating elements, light elements, or other components for carrying out the additional steps described herein.

The machine learning subsystem can comprise any combination of components suitable for receiving detected property values from the sequence testing subsystem, predicting predicted property values for untested proteins, selecting one or more of the untested proteins based on the predicted property values to thereby generate one or more selected proteins, and/or instructing the sequence testing subsystem to test the one or more selected proteins to obtain a detected property value therefor. A suitable component for these purposes includes a computer or server. As used herein "server" refers to a piece of computer hardware or software that provides functionality for other programs or devices, such as any one or more the various subsystems described herein. The server may be included with the other programs or devices on the same device or may be connected to the other programs or devices over a wireless network.

Suitable algorithms for carrying out the predicting and selecting steps include reinforcement learning algorithms. Suitable reinforcement learning algorithms include multi-armed bandit algorithms. Suitable multi-armed bandit algorithms include upper confidence bound and Thompson sampling algorithms. The multi-armed bandit algorithms are optionally employed with a strategy to account for tested nucleic acid sequences that do not have a detected property value and untested sequences that may or may not have a detectable property value. The strategy may be chosen from the group consisting of a constant-inactive strategy, a predicted positive strategy, and an expected strategy. With the constant-inactive strategy, the multi-armed bandit algorithms are configured to assign a property value of a pre-defined non-zero constant to each of the expressed proteins corresponding to a detected property value of zero when predicting the predicted property values for the untested proteins. With the predicted positive strategy, the multi-armed bandit algorithms are configured to select at least one of the possible nucleic acid sequences from the possible nucleic acid restrict the selected proteins to a set of the untested proteins having a predicted property value greater than a predefined threshold. With the expected strategy, the multi-armed bandit algorithms are configured to predict a predicted property likelihood for each of the possible proteins in the set, minimum-subtract an upper confidence bound in an upper confidence bound algorithm or a predicted property value in a Thompson sampling algorithm to generate a minimum-subtracted value for each of the possible proteins in the set, multiply each minimum-subtracted value by each predicted property likelihood to generate a product for each of the possible proteins in the set, and employ the product as an upper confidence bound or distribution mean for selecting the one or more of the untested proteins. We define minimum-subtraction here as subtracting the minimum value in a set of values from each value in that set. Examples of such strategies are provided in the examples.

The elements and method steps described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

It is understood that the invention is not confined to the particular construction and arrangement of parts herein illustrated and described, but embraces such modified forms thereof as come within the scope of the claims.

Examples

Sequence Fragment Design

DNA fragments capable of being assembled in different combinations to result in different full-length coding sequences were designed. The DNA fragments included natural sequence fragments, Rosetta fragments, and evolutionary fragments.

The natural sequence fragments were designed as follows. A set of candidate sequences was made by parsing UniReP90 for sequences that had near 70% identity with native *Streptomyces* sp. QM-B184 β-glucosidase (PDB code 1GNX). From these candidate sequences, a subset of six parent sequences, including 1GNX, was identified based on the criterion that each combinatorial pair of sequences had roughly 70% identity. A multiple sequence alignment (MSA) was then constructed and fed into the SCHEMA-RASPP algorithm (Voigt et al. 2002), which was implemented in Python. SCHEMA-RASPP generates recombinant libraries by splitting the aligned parent sequences in a specified number of breakpoints located randomly along the alignment. In this case, three breakpoints were used to make four fragments in each parent sequence. For each library, the algorithm outputs metrics for the likelihood of recombinant functionality and the expected average number of mutations that recombinants will have. The libraries generated were filtered by likelihood of success in Golden Gate Cloning (Engler et al. 2008), based on an in-house heuristic that uses ligation data to evaluate a library's set of DNA overhangs (Potapov et al. 2018). A library with a good balance between high mutation rate and recombinant functionality was selected. Fragments were constructed by splitting each parent sequence at the chosen library's breakpoints, then adding to each split site a Golden Gate overhang, which consists of a bsaI restriction enzyme recognition site and an overhang region of DNA that will connect fragments. The resulting 24 fragments were ordered from Twist Bioscience as plasmids in the pTwist Amp High Copy vectors. The Golden Gate reaction cuts the fragments out of the plasmids to allow for recombinant DNA assembly.

Two additional breakpoints for the Rosetta and evolutionary fragments were found using the Golden Gate Cloning success heuristic with the existing breakpoints. Five fragment regions using the new breakpoints were identified and each was used to create a Rosetta fragment and an evolutionary fragment.

Each Rosetta fragment was generated by running Rosetta Relax (Conway P, Tyka M D, DiMaio F, Konerding D E, Baker D. Relaxation of backbone bond geometry improves protein energy landscape modeling. Protein Sci. 2014 January; 23(1):47-55) with the 1GNX structure, allowing each residue position within the fragment region to vary to the residues present in the six natural sequences at the given position. The non-fragment regions were restricted to the 1GNX residues. The program output a locally optimal sequence and its associated Rosetta energy value. This process was repeated 100 times, and the sequence with the lowest energy value was selected. The five resulting fragments were then converted to plasmids in the same manner as the natural sequence fragments.

To generate the evolutionary fragments, the UniRef90 database was aligned to the natural sequence MSA. Sequences that aligned with less than 70% of MSA positions were discarded. From the remaining sequences, the frequencies of amino acids were calculated for each position in the natural sequence MSA. Frequencies of amino acids not present in the MSA at the given position were discarded. The most frequent remaining amino acid at each MSA position was added to a consensus sequence. The five fragment regions of the consensus sequence were used to construct plasmids in the same manner as the natural sequence fragments.

A schema of the generated fragments and their possible connectivities is shown in FIG. 4.

PCR Product Dilution for Cell-Free Protein Expression

Figure 5:
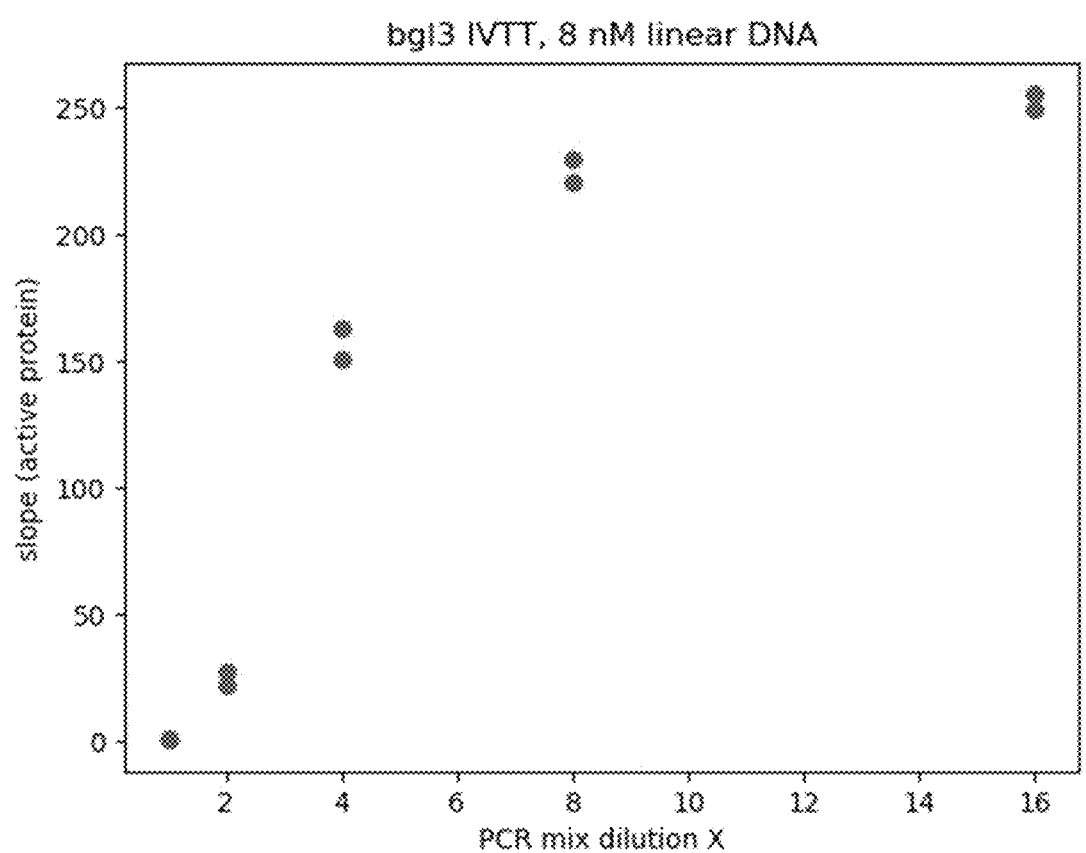
FIG. 5 shows amount of active protein expressed from diluted PCR-generated DNA templates without purification.

The ability to express functional protein directly from PCR-generated DNA templates without purification was tested at different dilution factors. This experiment was performed using the method described below with the modification of varying the amount of water added to the PCR product at the beginning of the In Vitro Protein Expression step to vary the dilution factor. Results are shown in FIG. 5. This experiment suggests any dilution at or above eightfold is sufficient to maintain the majority of protein expression activity.

Fully Automated Sequence Testing System

A fully automated system for assembling full DNA templates from DNA fragments, amplifying the DNA templates, expressing protein from the DNA templates, and functionally characterizing the expressed protein was generated and tested. An exemplary sequence testing system is shown in FIG. 1.

All procedures were performed on a Tecan Freedom EVO robot (Tecan Group Ltd., Männedorf, Switzerland) controlled via a custom Python (www.python.org) interface built for this project. This interface tracks wells used and solutions available, ensuring the robot always uses the first available clean well for new steps of execution. If a solution is low or there are insufficient wells available on a given plate, the interface is capable of sending alerts via Slack to request a refill. This robot/interface system has some capacity to replace its own plates from on-deck stockpiles, reducing the frequency of refill requests. Important components to the interface are three 96-well Bio-Rad microplates, labeled "Solution Plate," "Mix Plate," and "PCR Plate," as well as a BRAND 96-well flat bottom black microplate labeled "Assay Plate."

Stock Solutions

GGMM: Golden Gate Master Mix. Per 10 composed of 7 µL water, 2 µL New England BioLabs T4 DNA Ligase Reaction Buffer, and 1 µL NEB Golden Gate Enzyme Mix (BsaI-HFv2).

AAMM: Activity Assay Master Mix. Per 90 µL, composed of 30 µL water, 50 µL 2× assay buffer (100 mM NaCl, 20 mM phosphate, pH 7), 104, 4 mM 4-methylumbelliferyl β-D-glucopyranoside.

Golden Gate Assembly

5 µL of each fragment needed for a chosen chimera was combined in a single well on the Mix Plate and was mixed by pipetting 10 µL five times. 10 µL of this mixture was transferred to a new well on the PCR Plate. 10 µL of GGMM was added to the same well and mixed by pipetting 10 µL five times. The mixture was held at 37° C. for 1 h and the enzymes were inactivated at 55° C. for 5 min.

PCR

10 µL from the Golden Gate reaction well were transferred to a new well on the Mix Plate. To this was added 90 µL of 2 µM primer mix (2 µM each of ATCCCGCGAAAT-TAATACG (SEQ ID NO:1) and GGA-TATAGTTCCTCCTTTCAG (SEQ ID NO:2)) and the mixture was mixed by pipetting 45 µL five times. 10 µL of this dilution was added to a new well on the PCR Plate, and 10 µL Phusion® High-Fidelity PCR Master Mix with HF Buffer was added and mixed by pipetting 5 µL five times. The DNA was melted at 98° C. for 30 s, followed by 25 cycles of melting at 98° C. for 10 s, annealing at 56° C. for 30 s, and extending at 72° C. for 60 s. After the final cycle, the reaction was held at 72° C. for an additional 5 min to complete extension.

SYBR Green Checkpoint

10 µL from the PCR reaction was transferred to a new well on the mix plate. To this we added 90 µL water and mixed by pipetting 45 µL five times. From this diluted PCR product, we took 50 µL to a well on the assay plate. To this we added 40 µL water and 10 µL 10×SYBR Green. We read the fluorescence of this mixture by exciting at 485 nm and reading emission at 535 nm. If the fluorescence at this step exceeded a predetermined threshold, the Golden Gate and PCR steps were considered successful and the process continued. If not, the sequence was removed from the set of proteins currently being tested. If no proteins remained in that set, the robot returned to the Golden Gate step and tried again.

In Vitro Protein Expression

15 µL from the PCR product dilution from the previous step was transferred to a new well on the PCR Plate, 20 µL Bioneer AccuRapid™ Cell-Free Protein Expression Kit *E. coli* Extract supplemented with 40 µM fluorescein was added, 40 µL Bioneer AccuRapid™ Cell-Free Protein Expression Kit Master Mix was added, and the mixture was mixed by pipetting 40 µL five times. The plate was held at 30° C. for 3 h.

Thermal Stability Assay

For the following, temperatures were preset at program start as a fixed list of numbers in Celsius.

600 µL water was added to a 2-mL deep well plate, 70 µL of the in vitro protein expression crude product was added, and the mixture was mixed five times by pipetting 150 µL from the bottom of the dilution well and dispensing it again at the top. For each temperature tested, 50 µL protein was transferred to a PCR well, heated for 10 min at the chosen temperature, and 30 µL of the product was transferred to a new well on the Mix Plate for storage. When all temperatures were used, 90 µL AAMM was loaded into a well on the Assay Plate for each temperature. 10 µL heated protein from each temperature-labeled sample was added to a corresponding well of assay reagent, and the mixture was mixed by pipetting 20 µL five times in all cases. The plate was moved to the plate reader and fluorescein was measured by exciting at 494 nm and reading fluorescence at 512 nm. After this, protein activity was measured by monitoring product formation by exciting at 372 nm and reading fluorescence at 445 nm every 120 s for an hour.

Residual activity for each temperature was calculated by simple linear regression (scipy.stats.linregress (Jones et al. 2001 (Jones E, Oliphant E, Peterson P, et al. SciPy: Open Source Scientific Tools for Python, 2001, www.scipy.org/))) with respect to the 445 nm fluorescence over time. To control for variation in pipetting, all fluorescein measurements were divided by the greatest value observed, and the activity values were divided by the corresponding fluorescein quotient. The normalized slopes were then fit to a double logistic function (with the second logistic heavily restricted to represent background) by gradient descent (using scipy.optimize.curve fit (Jones et al. 2001)), and the T50 value (midpoint of the curve), slope coefficient, and magnitude from the parameters of the first logistic function were taken, along with an uncertainty value for each calculated from the covariance matrix of fit parameters. All this information was passed back to the learning module which saved it to a file Results The above-described steps were tested on a number of proteins having parent sequences from the UniRef90 database to confirm the reproducibility of outcomes. Fragments derived from a single parent sequence were assembled, the assembled DNA was amplified and expressed, and the expressed protein was tested for thermal stability.

Figures 6A, 6B:
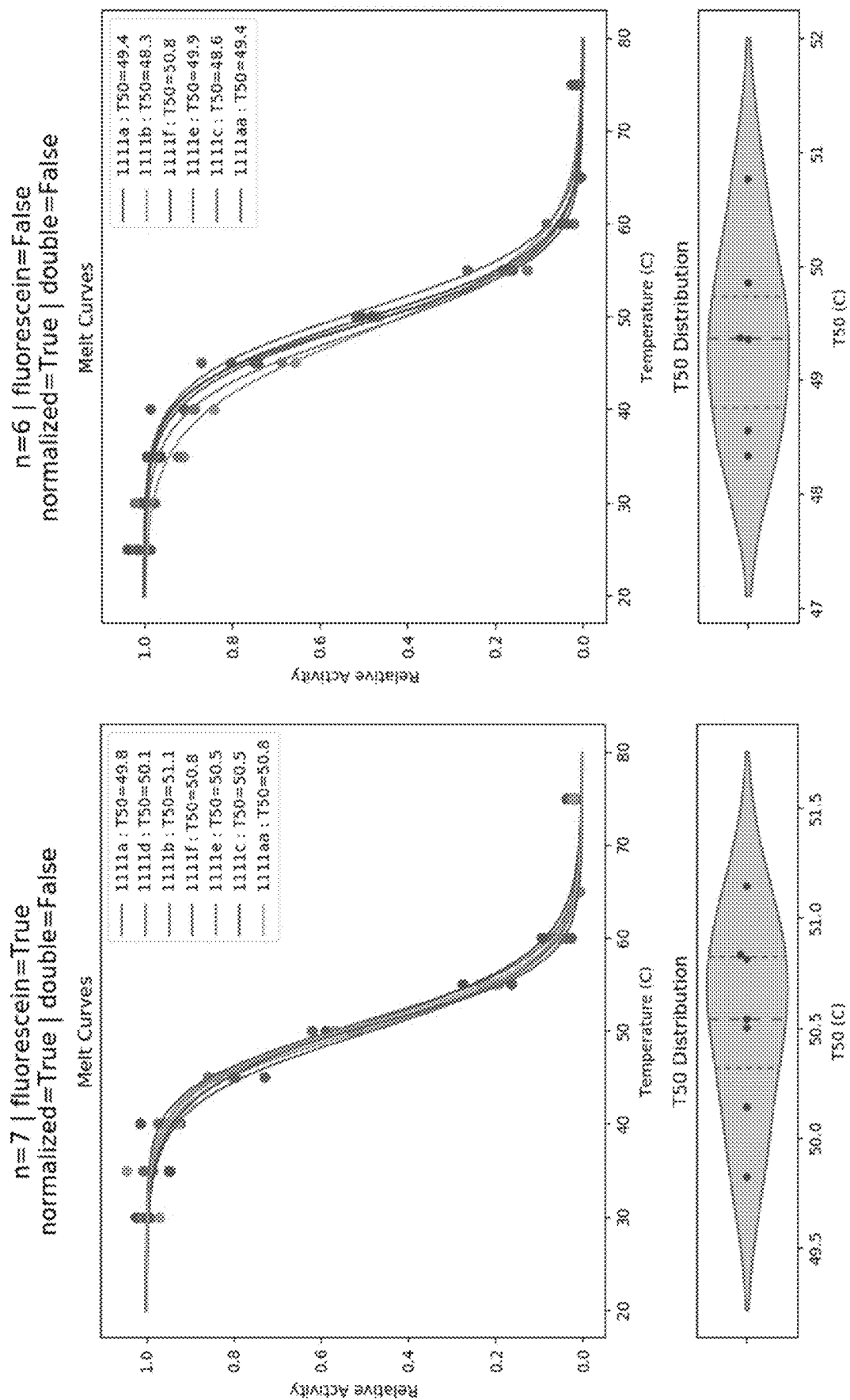
FIGS. 6A-6J show temperature-dependent activity curves (top panels) and T50 distributions (bottom panels) for a number of natural, non-chimeric β-glucosidase proteins generated in an automated system configured to assemble complete reading frame DNA from separate fragments, amplify the DNA, express protein, and test for thermal stability. In each of FIGS. 6A-6J, "n" indicates the number of replicates that were fit to a curve, "fluorescein" indicates whether fluorescein normalization was used, "normalized" indicates whether the upper magnitude was compressed to 1 for easy comparison between curves, and "double" indicates whether the curve fit is a double logistic (if false, the fit is a single logistic). Each replicate sequence is identified with four numerical digits and a letter indicator. Each numerical digit refers to one of the four separate fragments derived from a parent sequence. The value of the digit identifies the parent sequence from which the fragment was derived. The letter indicators identify separate replicates. Thus, 1111a refers to a first replicate of a protein made from each of the four fragments derived from parent sequence 1, 1111b refers to a second replicate of a protein made from each of the four fragments derived from parent sequence 1, 2222a refers to a first replicate of a protein made from each of the four fragments derived from parent sequence 2, 2222b refers to a second replicate of a protein made from each of the four fragments derived from parent sequence 2, and 1212a, for example, would refer to first replicate of a chimeric protein made from two fragments derived from parent sequence 1 and two fragments derived from parent sequence 2.
Figure 6D:
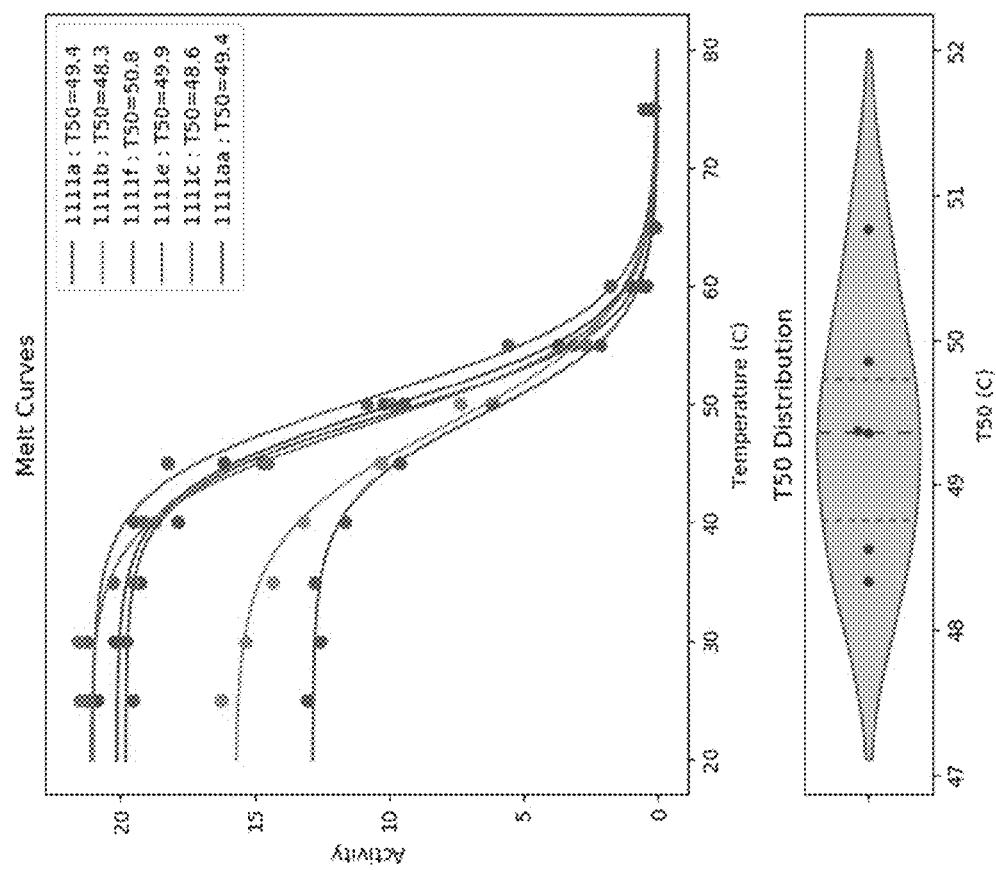
Figure 6C:
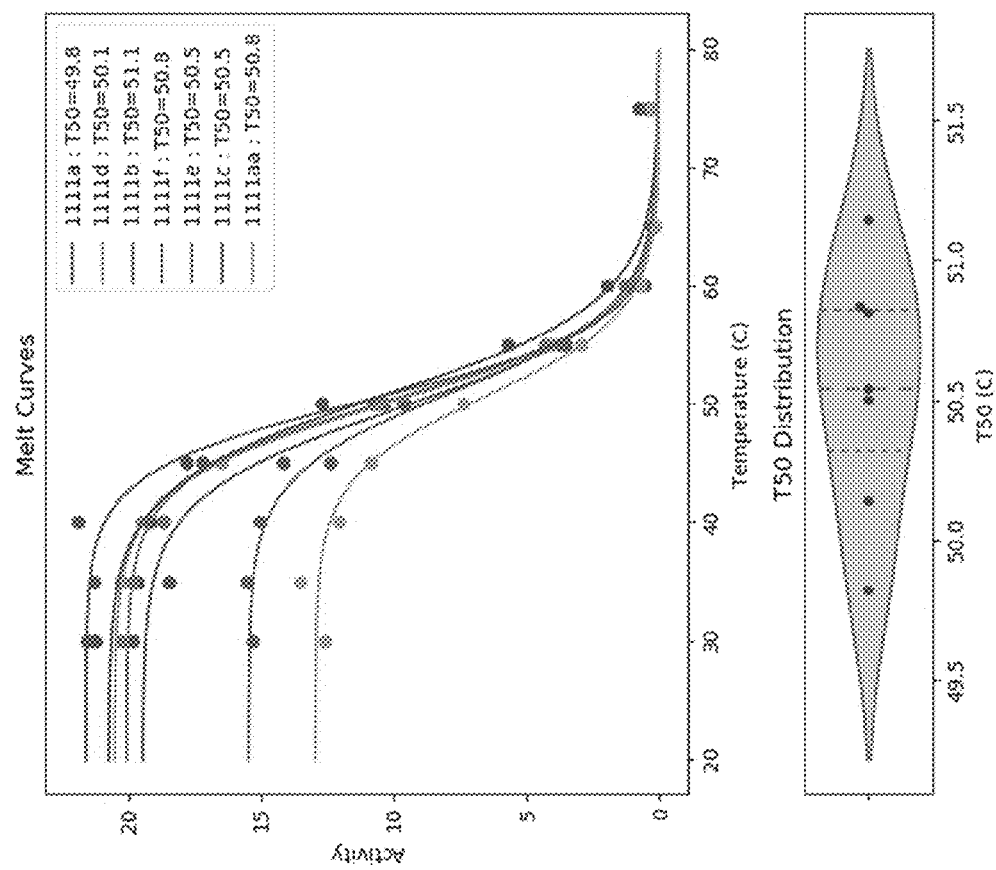

As shown in FIGS. 6A and 6C, the system was reproducible to the extent that any obtained value could be assumed to be accurate to within ~1° C. This is sufficiently precise for effective learning as per simulations.

The data for parent sequence 1 shown in FIGS. 6A and 6C was analyzed without normalizing to fluorescein. See FIGS. 6B and 6D. The reproducibility shown in FIGS. 6A and 6C was lost. Without fluorescein normalization, sequence 1111d failed to fit to a logistic curve and therefore did not end up on the plots.

Figure 3:
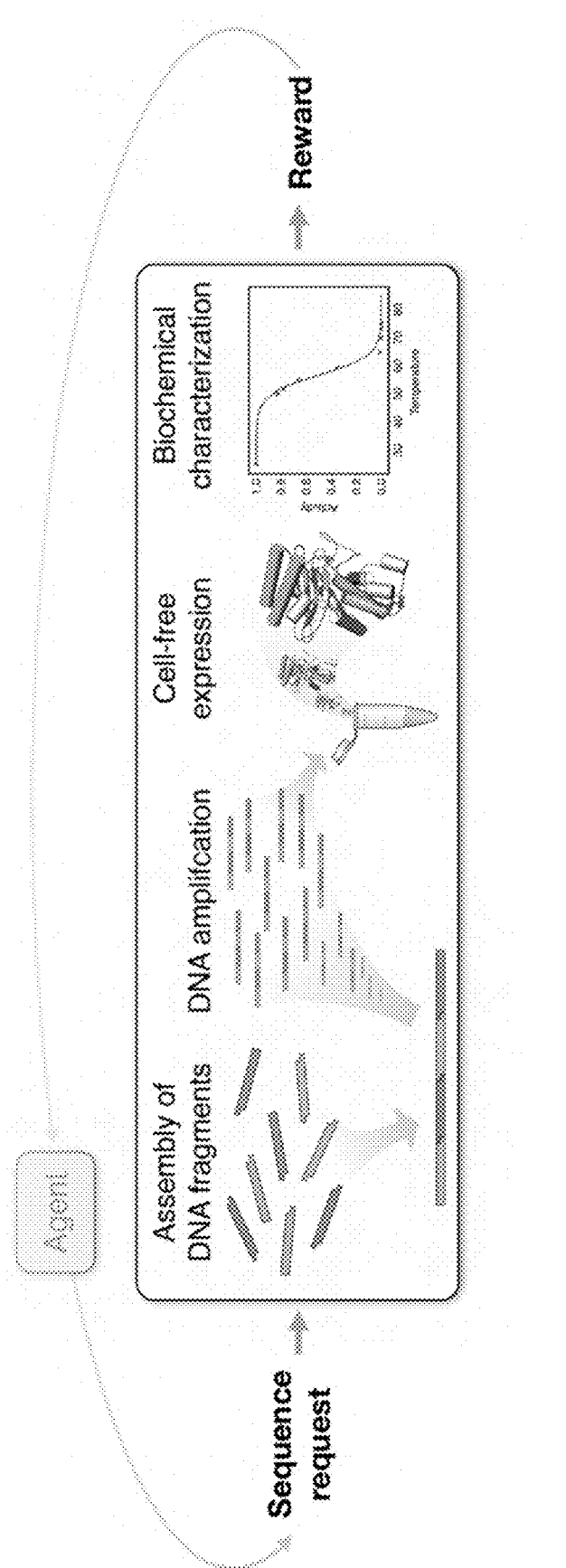
FIG. 3 shows a schema of an exemplary embodiment of the invention, wherein the machine learning subsystem (component) is shown as "agent."

The data for parent sequence 1 was analyzed with (FIGS. 3A and 3B) and without (FIGS. 6C and 6D) normalizing the curves to a relative magnitude of 1 for easy comparison. These data show that absolute magnitude of activity is not a concern for reproducibility.

Figures 6E, 6F:
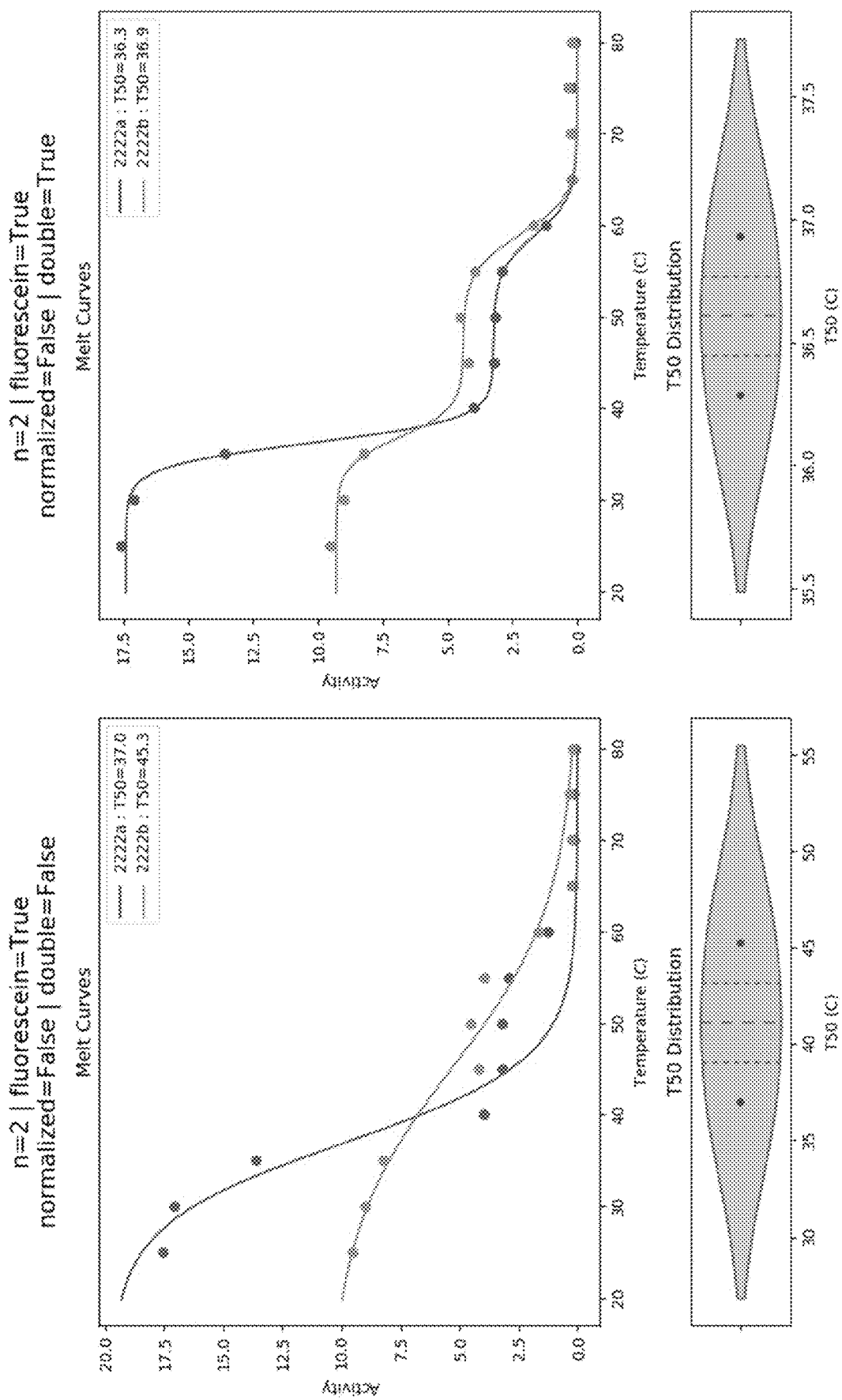
Figures 6G, 6H:
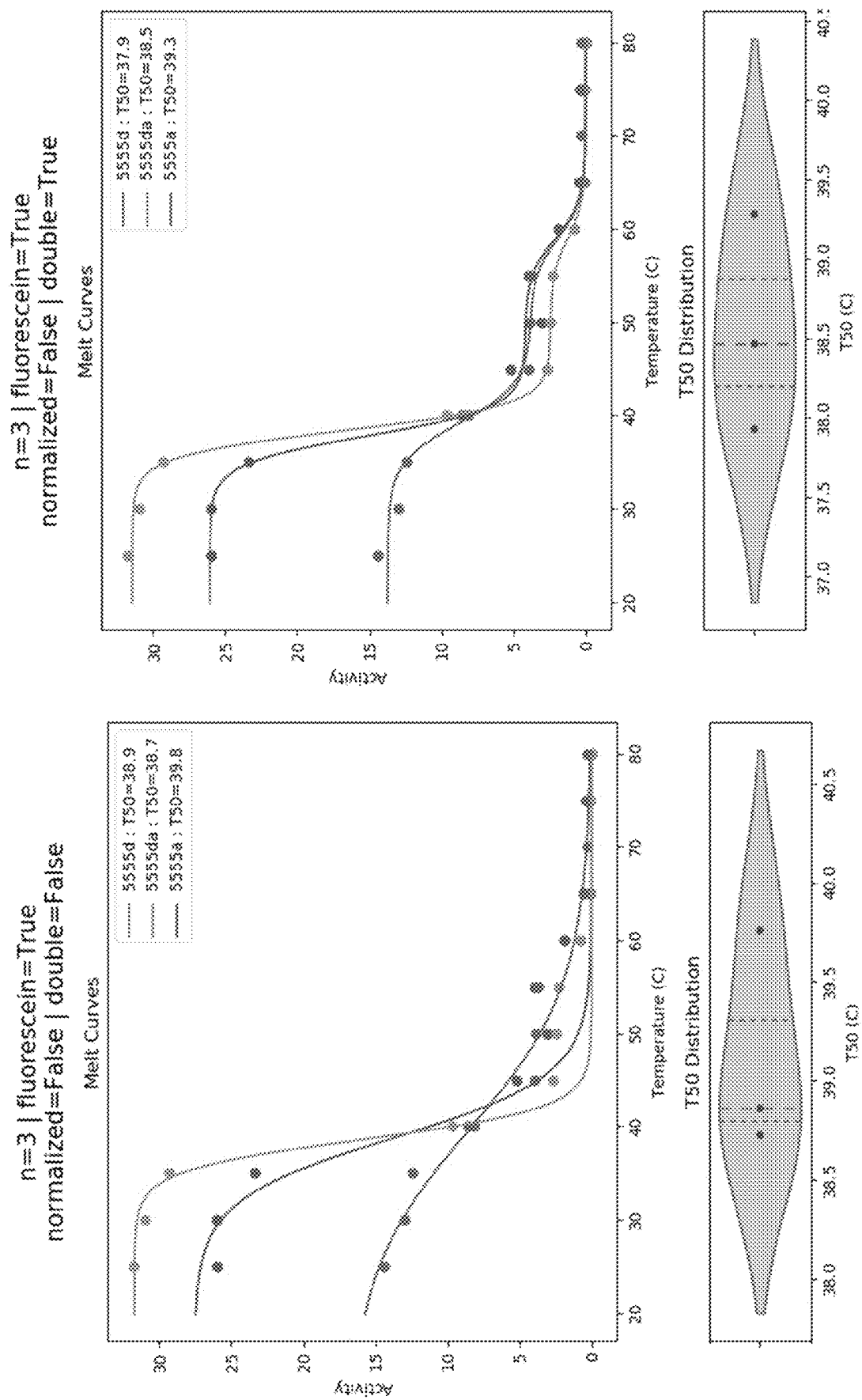

FIGS. 6E-6H show effects of single logistic fit (FIGS. 6E and 6G) versus double logistic fit (two logistic curves added together) (FIGS. 6F and 6H) for proteins having parent sequences 2 (FIGS. 6E and 6F) and 5 (FIGS. 6G and 6H). In FIGS. 6E and 6G, we observed with single logistic fit a plateau in melting (~45-60 degrees) representing background enzymatic activity from the expression medium. We fit a double logistic with the lower of the two fixed at parameters of that background calculated from blank experiments (T50=59.1, k=0.466) and capped at 5 magnitude maximum. As shown in FIGS. 6F and 6H, the double logic fit allowed us to represent only the melting curve of the protein of interest.

Figures 6I, 6J:
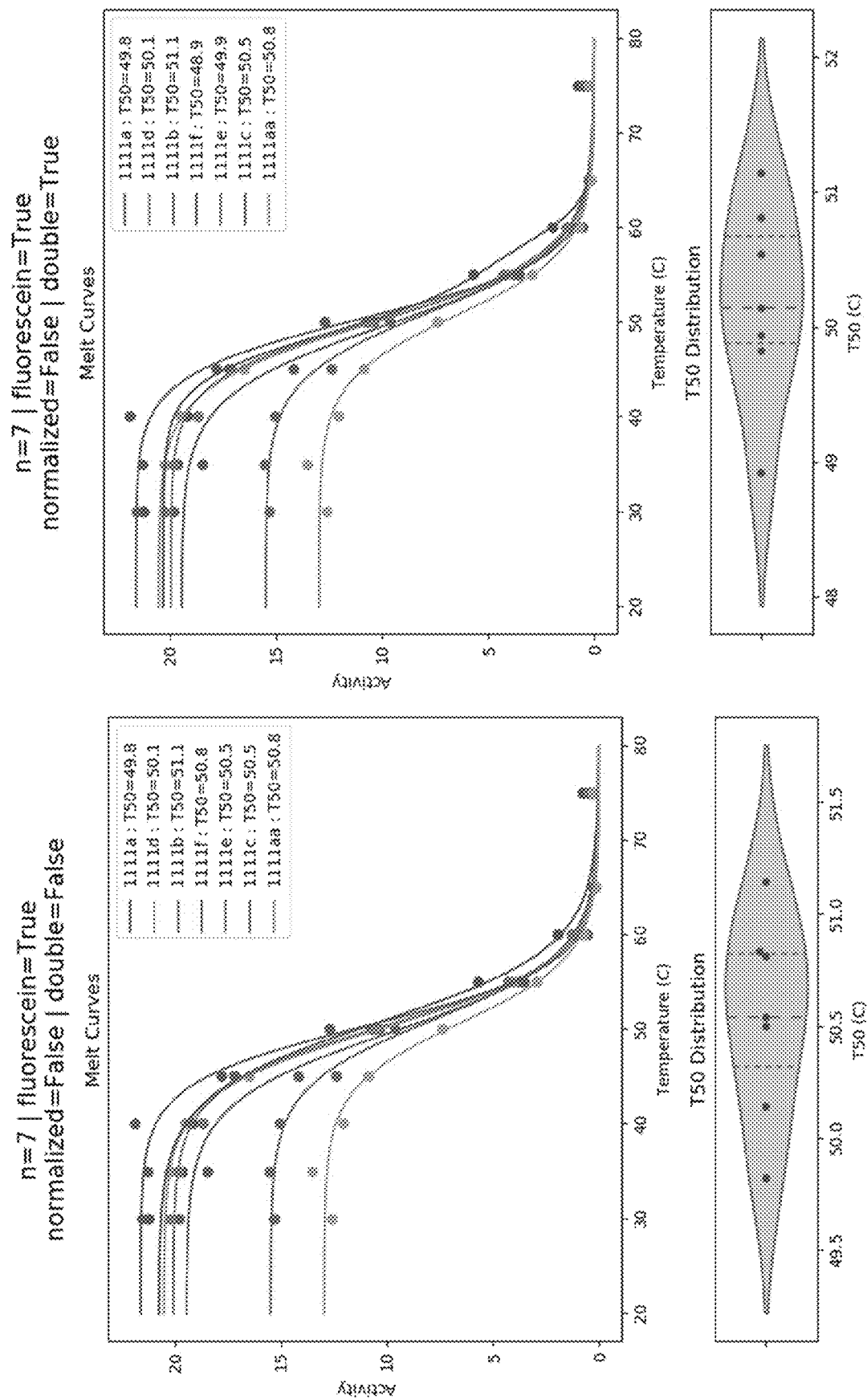

When the curve is already a good fit and there is no visible plateau, the second logistic has no effect on the overall curve. Looking at data from parent sequence 1 in FIGS. 6I and 6J, for example, only 1111f and 1111e had any change as a result of the double logistic. All others had a magnitude for the lower logistic of <1E-12, as would be expected when a single logistic fully describes the data.

Machine Learning Subsystem

The machine learning component of the system is responsible for instructing the robot to test informative sequences, updating the model based on the results, and determining when the sequence space has been explored well enough to decide the best sequence has been found. This task falls under the multi-armed bandit (MAB) set of machine learning problems. A number of strategies based on Gaussian process models were designed to perform these tasks and are described below. These strategies were tested on existing protein engineering datasets, then integrated into the robot's program.

Gaussian process regression is a Bayesian kernel regression technique that has a number of advantages over more standard regression techniques, the most relevant of which is an estimate of prediction accuracy. Gaussian process solutions to the MAB capitalize on this advantage by preferring to test options that are possibly better than any previously tested options, a principle known as the optimism in the face of uncertainty. Two such solutions formed the basis of strategies developed for the platform. The first, the upper confidence bound (UCB) algorithm, uses the predicted response value and estimated prediction accuracy for a given testing option to determine the maximum value possible within some confidence interval. The value is known as the upper confidence bound and is generally taken to be the predicted mean plus two standard deviations. By repeatedly choosing to test the option with the largest upper confidence bound at each timepoint, UCB algorithms use optimism to find the optimal option. The second, Thompson sampling (TS), uses the predicted response value and estimated prediction accuracy for each option to construct a probability distribution for each option. The distributions are then sampled, and the option that gives the largest sample is selected for testing. Similar to UCB, TS optimistically gives uncertain and large predictions preference, but with an additional element of randomness that can help prevent confinement to local optima.

MABs can be used to model the protein engineering scenario by considering sequences as options and each sequence's function value as the option's response value. While the MAB model is mostly sufficient, the protein engineering scenario has a caveat that is unique, namely the presence of inactive sequences. Depending on the function being optimized, inactive sequences may not have a defined function value. The simplest treatment is to leave the MAB model unmodified and simply ignore undefined values in training. Three modifications to UCB and TS were also designed to explicitly handle inactive sequences. The first and simplest modification was to define the function value of inactive sequences as some predefined constant. The second and third modifications used a Gaussian process classifier to explicitly predict the likelihood of activity for each sequence based on previous observations of activity. The second modification, for example, was to restrict the set of possible options to sequences that are predicted to be active. The third modification was to minimum-subtract either the upper confidence bound (for UCB) or predicted function value (for TS) for each sequence, then multiply the resulting value by the activity likelihood. The resulting value was then taken as the new upper confidence bound or distribution mean for sequence selection. By applying each modification or no modification to both UCB and TS, eight strategies resulted. These strategies were denoted by x_unmodified, x_const_inactive, x_predicted_positive, and x_expected, in respective order of modification, with x being either ucb (for UCB) or is (for TS). Detailed methods for implementing the strategies is found in in the section below entitled "Multi-Armed Bandit Strategies."

Figure 7:
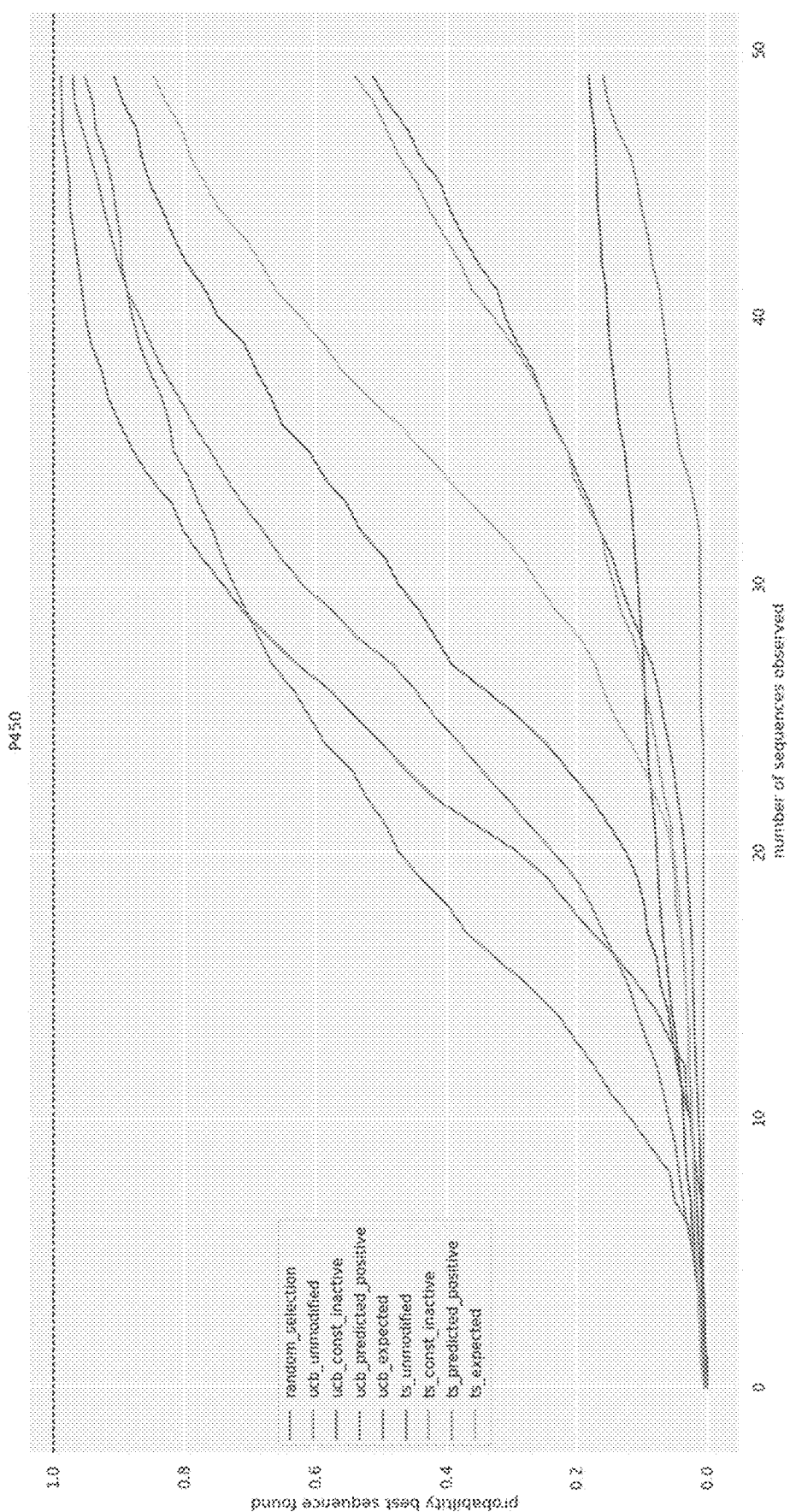
FIG. 7 shows simulations of the machine learning component of the platform performed on previously collected Cytochrome P450 data to test the performance of six strategies multi-armed bandit (MAB) strategies. Each simulation trial consisted of 50 design-test-learn cycle iterations. In each iteration the platform selected a sequence to test based on the specified strategy, observed the thermostability of the selected sequence, then updated the model. 1000 trials were performed for each strategy. At each iteration, the proportion of trials for a given strategy that had previously observed the sequence with maximum thermostability on the current or any previous iteration was calculated. This value was inferred to be the probability that the given strategy would observe the maximum sequence within a specific number of observations, and is located on they axis of the figure.
Figure 8A:
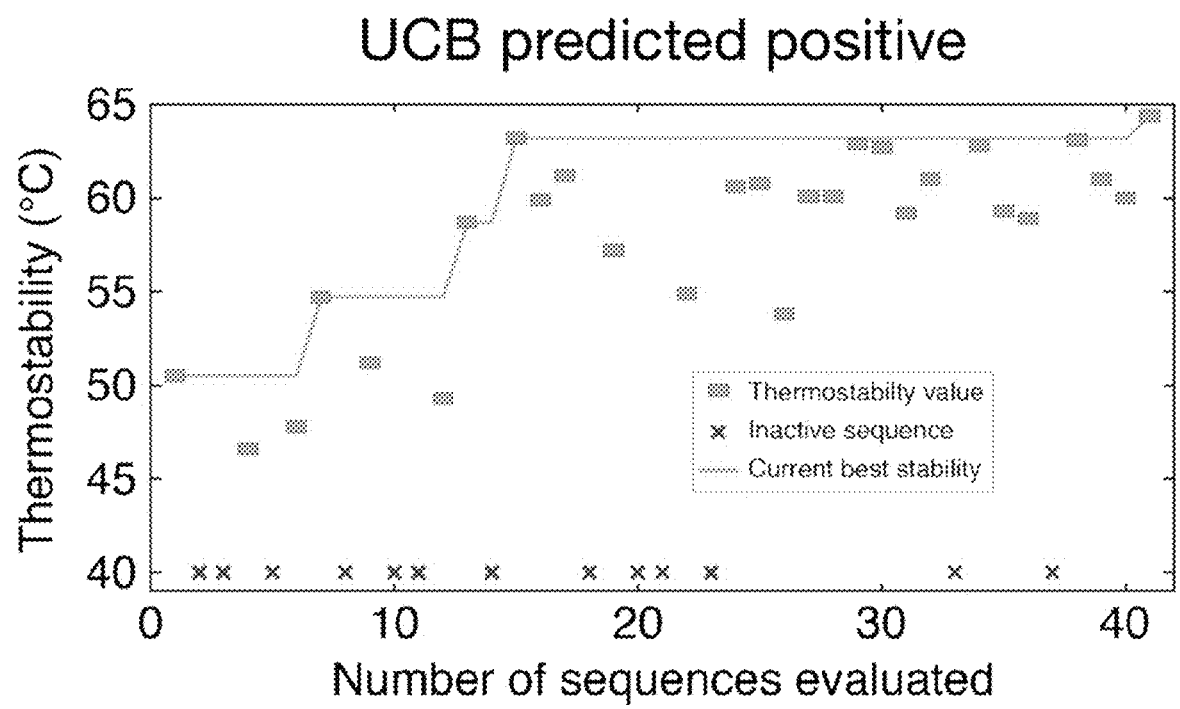
FIGS. 8A and 8B show plots of representative trials from the simulation described in FIG. 7, with FIG. 8A showing trials from the predicted positive UCB strategy and FIG. 8B showing trials from the random selection. The x axis shows the number of sequences observed at each time, proceeding left to right. Each datapoint shows the thermostability or inactivity of the selected sequence at a given iteration. The lines display the maximum thermostability value observed on or before the current iteration. In general, the modified MAB strategies were able to find more thermostable sequences faster than random selection.
Figure 8B:
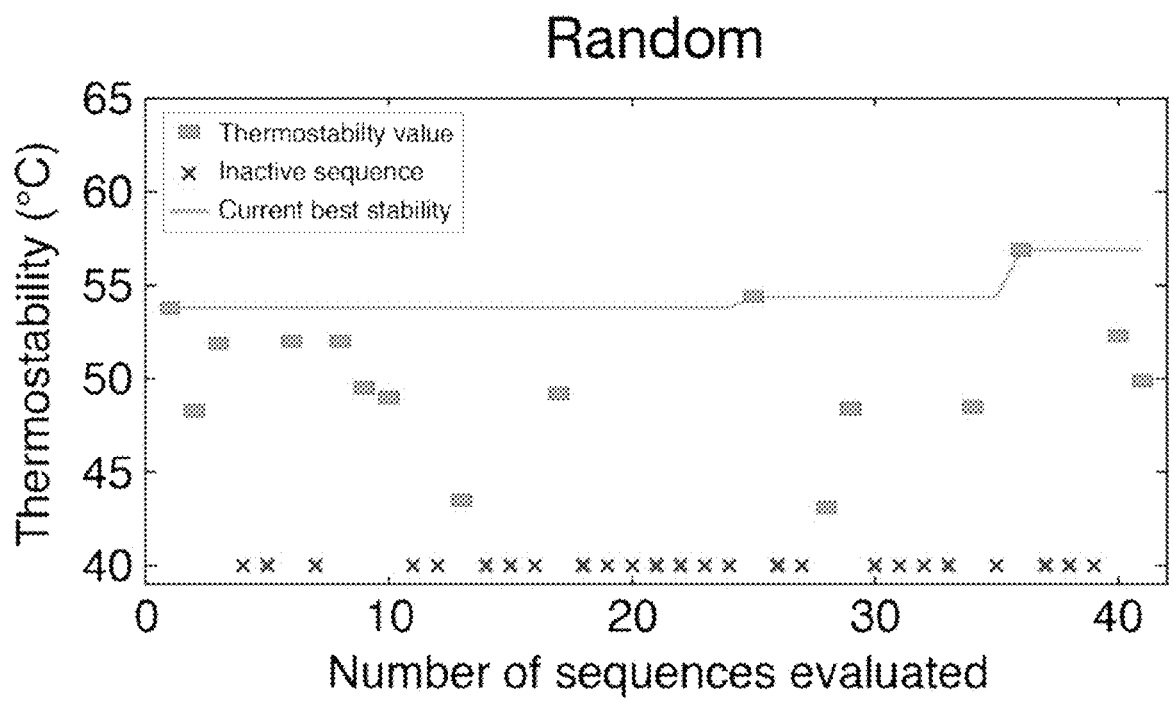
Figure 9:
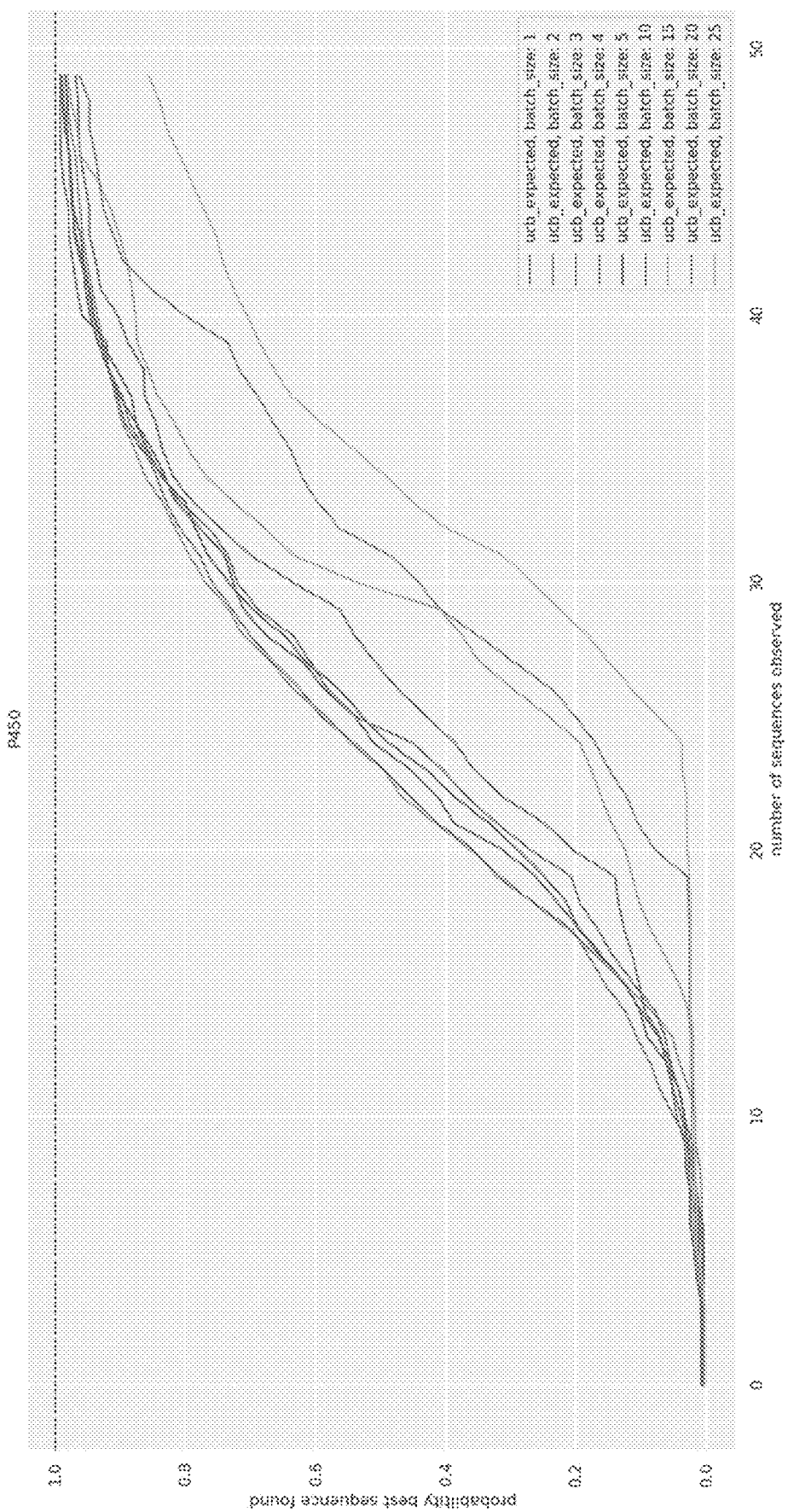
FIG. 9 shows simulations identical to those for the expected UCB in FIG. 7, with the exception that the number of sequences observed at each design-test-learn cycle iteration could vary. Batches were assembled by assuming the predicted value for the selected sequence was accurate and repeating the expected UCB with that assumed data, repeating this process until the desired number of sequences had been selected, then testing all selected sequences simultaneously.

The eight strategies were implemented in Python with the Gaussian process module from scikit-learn and evaluated with simulations. A preexisting protein engineering dataset containing sequences for Cytochrome P450 was used in the simulations (Li et al. 2007). The dataset contained chimeric sequences that were each active with an associated thermostability value or were inactive. Trials were run by first assuming that all sequences were unobserved, then sequentially building the model by choosing to observe the thermostabilities of certain sequences. 1000 trials for each strategy were performed on the dataset. The results of these trials are shown in FIGS. 7, 8A, and 8B. Additional simulations were run to determine the effect of testing multiple sequences per round. As shown in FIG. 9, batch sizes under ten did not significantly affect performance.

Based on the results of the simulations, it was determined that ucb_expected was the best strategy, and thus was incorporated into the robotic platform.

Overall, the machine learning component of the platform includes a list of all possible protein sequences with associated activity and function values determined for any previously tested sequences, a Gaussian process model that is updated every cycle, and an MAB algorithm, such as the ucb_expected strategy, for selecting one or more of the possible sequences for testing in each subsequent cycle.

Multi-Armed Bandit Strategies

DEFINITIONS

"Data" is a list of datapoints of the form (sequence, activity, T50). "Sequence" is an aligned binary sequence. "Activity" is a 1 or 0 representing whether the sequence is active or inactive, respectively. T50 is null if activity=0 and is the sequence's T50 otherwise. The response variables for classification and regression are activity and T50, respectively. Each datapoint has a true activity and T50, but these values may not be known.

Observing a sequence reveals the true activity and T50.

Standard deviation is abbreviated to std.

Minimum subtraction of a given value for a set of datapoints is the subtraction of the smallest value in the set from all values.

"Observed" datapoints is the set of datapoints that have previously been observed, which consequently have defined activity and T50. "Hidden sequences" is the set of sequences that have previously have not yet been observed, and therefore have undefined activity and T50. "Positive" refers to detectable activity (activity=1). "Negative" refers to a lack of detectable activity (activity=0). "Observed positive datapoints" is the subset of observed datapoints with activity=1. "Observed negative datapoints" is the subset of observed datapoints with activity=0. "Budget" refers to a preset number of sequences for testing. "Probability active" refers to the probability that a given sequence with have a predicted activity. "Threshold" refers to a preset probability, which is typically 0.5.

When a sequence is observed, it is removed from hidden sequences and the associated datapoint is put in observed datapoints.

Helper Functions

The following functions contain Python 3 code that use the sklearn package for Gaussian Process regression and classification, which implements the Gaussian Process algorithms described in Rasmussen and Williams 2006 (Rasmussen C E and Williams C K I, Gaussian Processes for Machine Learning, the MIT Press, 2006, ISBN 026218253X (www.GaussianProcess.org)), particularly Chapters 2 and 3.

```
"Kernel" can be any kernel created with sklearn.gaussian_process.
gp_regression(training_datapoints, testing_sequences):
    let train_X and train_Y be the sequence and T50 for each datapoint,
        respectively, with order preserved
    sklearn code:
    from sklearn.gaussian_process import GaussianProcessRegressor
    gpr = GaussianProcessRegressor(kernel = kernel)
    gpr.fit(train_X, train_Y)
    means, stds = gpr.predict(testing_sequences, return_std=True)
    return means, stds
gp_classification(training_datapoints, testing_sequences):
    let train_X and train_Y be the sequence and activity for each datapoint,
        respectively, with order preserved
    sklearn code:
    from sklearn.gaussian_process import GaussianProcessClassifier
    gpc = GaussianProcessClassifier(kernel=kernel)
    gpc.fit(train_X, train_Y)
    probs = gpc.predict_proba(testing_sequences)
    probs_positive = [p[1] for p in probs]
    return probs_positive
Strategies
    ucb_unmodified(data):
        while # sequences observed < budget:
            if observed positive datapoints is empty:
                observe a random hidden sequence
            else:
                get mean and std for each hidden sequence from
                    gp_regression(observed positive datapoints,
                        hidden sequences)
                let upper confidence bound value for each hidden sequence be
                    mean + 2*std for that hidden sequence
                observe hidden sequence with largest upper confidence bound value
    ucb_const_inactive(data, inactive_T50):
        set T50 of every observed negative datapoint to inactive_T50
        while # sequences observed < budget:
            if observed positive datapoints is empty:
                observe a random hidden sequence
            else:
                get mean and std for each hidden sequence from
                    gp_regression(observed datapoints, hidden sequences)
                let upper confidence bound value for each hidden sequence be
                    mean + 2*std for that hidden sequence
                observe hidden sequence with largest upper confidence bound value
    ucb_predicted_positive(data, threshold):
```

```
    while # sequences observed < budget:
      if observed positive datapoints is empty:
        observe a random hidden sequence
      else:
        if observed negative datapoints is not empty:
          get probability active for each hidden sequence from
              gp_classification(observed_datapoints,
                                        hidden sequences)
        else:
          probability active = 1 for all hidden sequences
        let possible be the set of sequences with probability active
            greater than threshold
        get mean and std for each possible sequence from
            gp_regression(observed positive datapoints,
                                        possible sequences)
        let upper confidence bound value for each hidden sequence be
                                        mean + 2*std for that hidden sequence
        observe possible sequence with largest upper confidence bound value
ucb_expected(data):
  while # sequences observed < budget:
    if observed positive datapoints is empty:
      observe a random hidden sequence
    else:
      if observed negative datapoints is not empty:
        get probability active for each hidden sequence from
            gp_classification(observed_datapoints,
                                        hidden sequences)
      else:
        probability active = 1 for all hidden sequences
      get mean and std for each hidden sequence from
          gp_regression(observed positive datapoints,
                                        hidden sequences)
      let upper confidence bound value for each hidden sequence be
                                        mean + 2*std for that hidden sequence
      minimum-subtract ucb for all hidden sequences
      update upper confidence bound value for each hidden sequence to
                                        upper   confidence   bound   value*probability
active
      observe hidden sequence with largest upper confidence bound value
ts_unmodified(data):
  while # sequences observed < budget:
    if observed positive datapoints is empty:
      observe a random hidden sequence
    else:
      get mean and std for each hidden sequence from
          gp_regression(observed positive datapoints,
                                        hidden sequences)
      let sample value for each positive hidden sequence be a sample from
          normal distribution N(mean, std)
      observe hidden positive sequence with largest sample value
ts_const_inactive(data, inactive_T50):
  set T50 of every observed negative datapoint to inactive_T50
  while # sequences observed < budget:
    if observed positive datapoints is empty:
      observe a random hidden sequence
    else:
      get mean and std for each hidden sequence from
          gp_regression(observed datapoints, hidden sequences)
      let sample value for each positive hidden sequence be a sample from
          normal distribution N(mean, std)
      observe hidden sequence with largest sample value
ts_predict_positive(data, threshold):
  while # sequences observed < budget:
    if observed positive datapoints is empty:
      observe a random hidden sequence
    else:
      if observed negative datapoints is not empty:
        get probability active for each hidden sequence from
            gp_classification(observed_datapoints,
                                        hidden sequences)
      else:
        probability active = 1 for all hidden sequences
      let possible be the set of sequences with probability active
          greater than threshold
      get mean and std for each possible sequence from
          gp_regression(observed positive datapoints,
                                        possible sequences)
      let sample value for each positive hidden sequence be a sample from
          normal distribution N(mean, std)
```

```
        observe possible sequence with largest sample value
ts_expected(data):
    while # sequences observed < budget:
        if observed positive datapoints is empty:
            observe a random hidden sequence
        else:
            if observed negative datapoints is not empty:
                get probability active for each hidden sequence from
                    gp_classification(observed_datapoints,
                                      hidden sequences)
            else:
                probability active = 1 for all hidden sequences
            get mean and std for each hidden sequence from
                gp_regression(observed positive datapoints,
                              hidden sequences)
            minimum-subtract mean for all hidden sequences
            update mean for all hidden sequences with mean*probability active
            let sample value for each positive hidden sequence be a sample from
                normal distribution N(mean, std)
            observe hidden sequence with largest sample value
```

Fully Autonomous Protein Engineering System

The automated sequence testing system and machine learning component were combined to form a fully autonomous protein engineering system.

The sequence testing component of the system was configured as outlined above except for the added capability of choosing among any combination of the natural sequence fragments, the Rosetta sequence fragments, and the evolutionary sequence fragments for designing and generating full-length sequences for functional testing. The machine learning component of the system was configured to classify all observed proteins as either active or inactive, with the active proteins having associated T50 values. Gaussian process classification was first trained on all observed sequences to predict active/inactive for unseen sequences. Gaussian process regression was then trained on all observed active sequences to predict T50 and variance values for unseen predicted active sequences using the ucb_expected MAB strategy. The sequence with the greatest T50+95% confidence interval (2 standard deviations) after multiplication with the probability of activity was selected to test in each subsequent round of testing. Repeating this process should result in rapid convergence to the best sequence available.

Figure 10A:
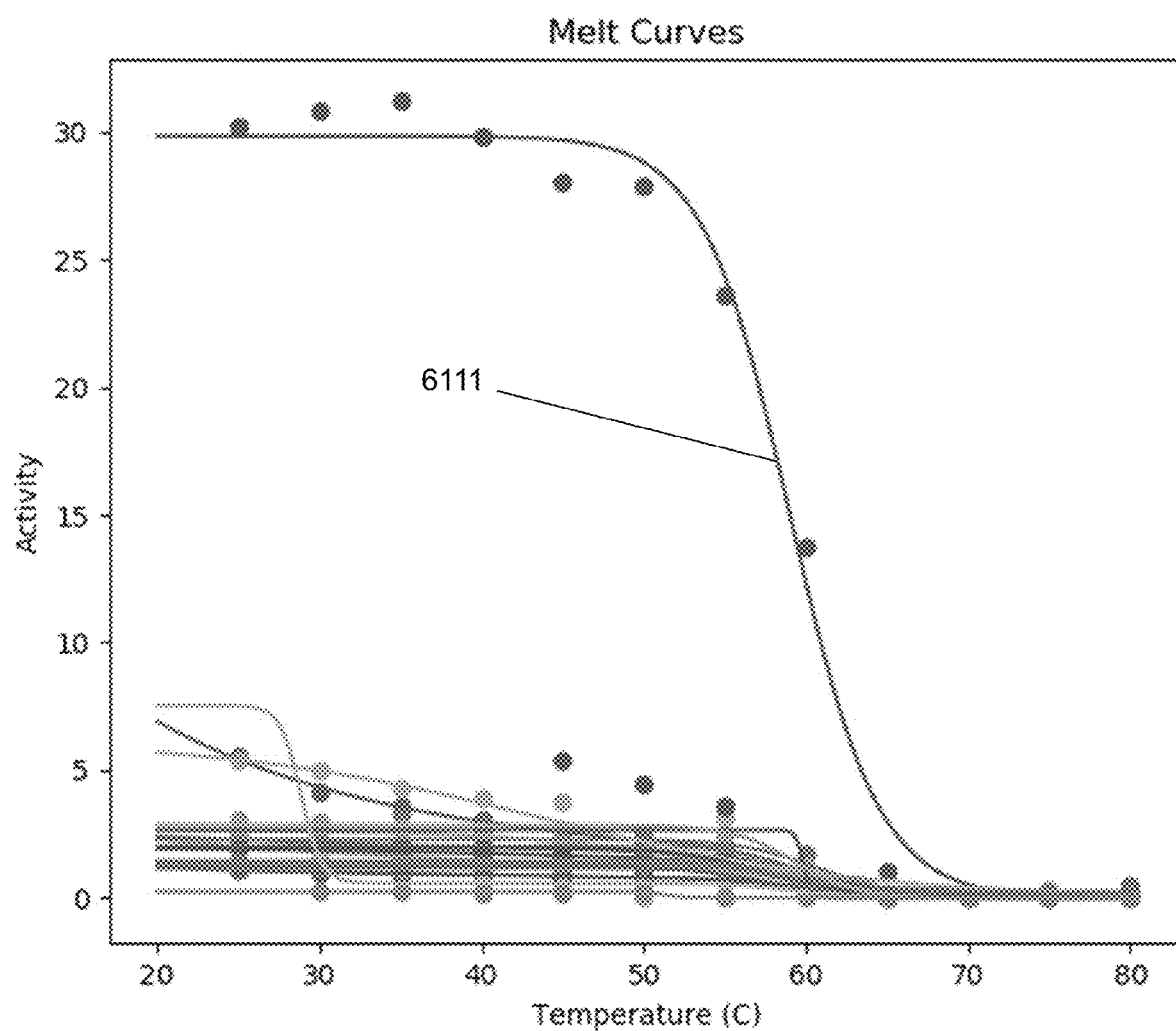
FIGS. 10A and 10B show results from unassisted learning runs with an exemplary fully autonomous protein engineering system.

Two learning experiments were performed with the fully autonomous protein engineering system. The first was performed with absolutely no starting information and was performed prior to the introduction of SYBR to confirm success from the first two steps. In the absence of the SYBR check, we were not able to determine how many inactive results were truly inactive versus those that simply failed the Golden Gate or PCR step. Because we did not load any information prior to beginning, the learning was a random search until a live sequence was discovered. A confirmed active sequence was found. This sequence was number 6111 in our chimera labeling system. Sequence 6111 is the high-activity variant seen FIG. 10A. At a T50 of 59.1, it was the most thermostable protein we have yet observed.

Figure 10B:
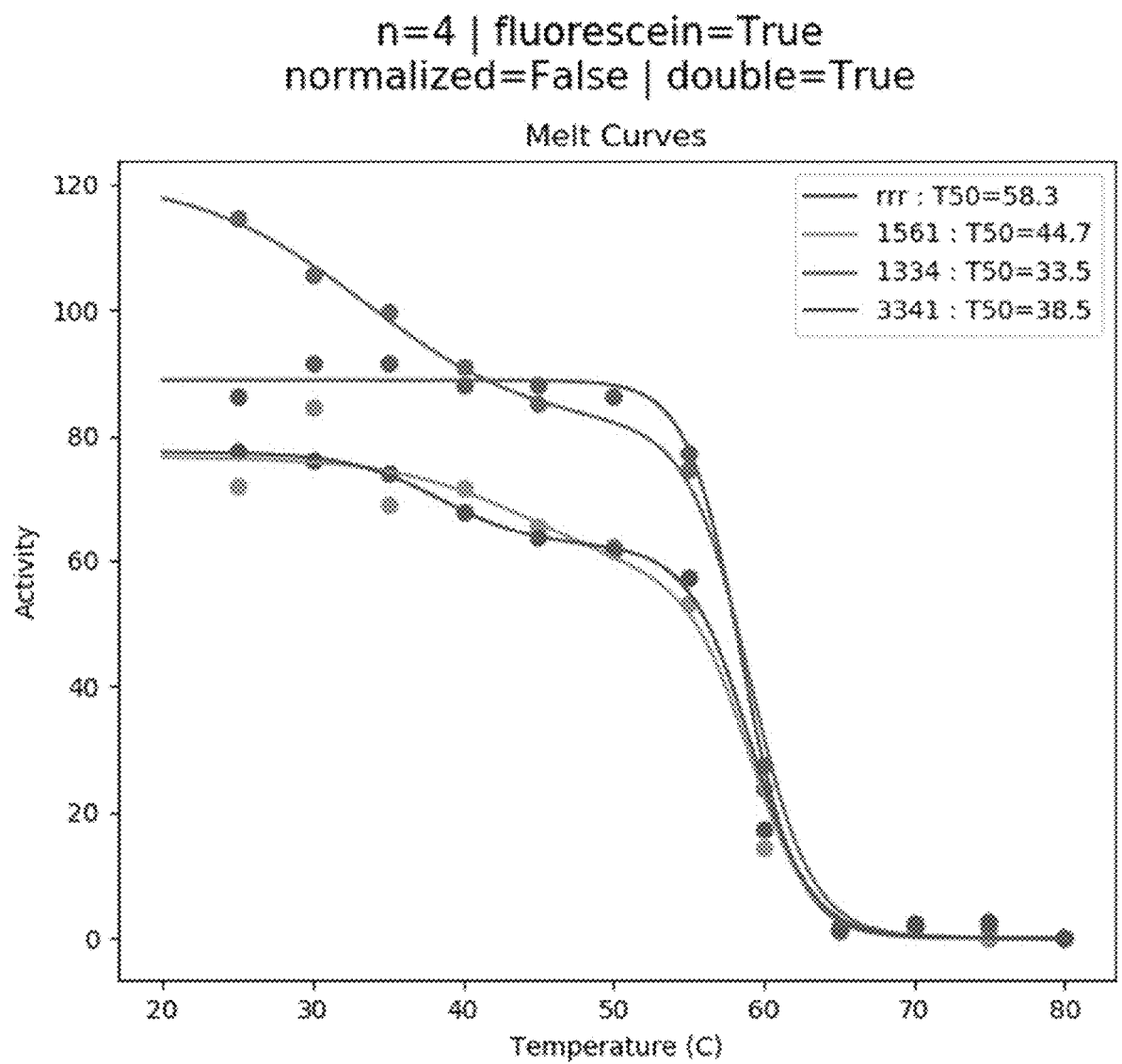

The second learning experiment had two key differences. First, we started the learning with data for all parental sequences already present, so the robot was learning rather than guessing from the start. Second, tests with insufficient SYBR fluorescence were removed from the data set as the robot ran in a primitive version of the now-automated SYBR-based checkpoint system. The experiment only ran for 6 cycles, of which two were repeated due to low SYBR, but we already saw a higher fraction of functional sequences than the previous trial. Based on the results shown in FIG. 10B from the four successful expressions, sequences 1334 and 3341 are active though not easily separable from background, 1561 is uncertain, and rrr is inactive. The magnitude of the curves relative to background is much lower than it otherwise would be due to the condition of the reagents employed in this particular experiment.

Figure 11:
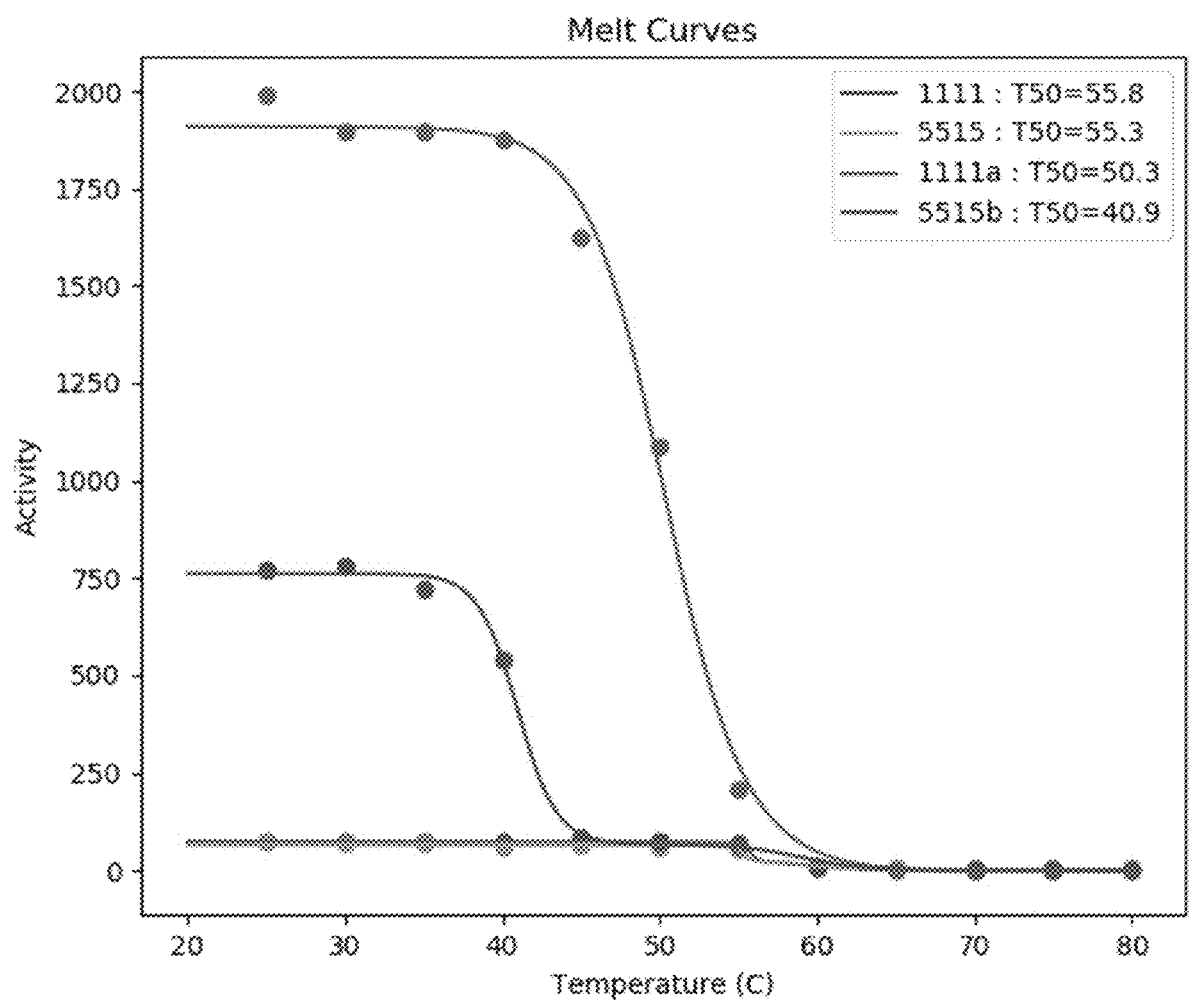
FIG. 11 shows a comparison of expression before and after increasing Golden Gate product usage and separating PCR mix and primers prior to use. 1111 and 5515 used 25× diluted Golden Gate product and pre-mixed PCR mix and primers. 1111a and 5515b used 10× diluted Golden Gate product in primers kept separate from PCR mix.

FIG. 11 shows that increasing Golden Gate product usage and separating PCR mix and primers prior to use results in higher and more consistent positive activity from both parental and chimeric sequences.

Decentralized System

The fully autonomous protein engineering system described above (centralized system) can be configured as a decentralized system. The decentralized system operates as in the centralized system, except that the machine learning portion takes place on a server and the biochemical steps take place on a robot connected to the server via a network. As in the centralized system, the robotic biochemical portion accepts sequences and outputs desired biochemical properties, and the machine learning portion accepts data, updates its model, and sends sequences according to the updated model.

Key differences between the centralized and decentralized systems are as follows:

1) Instead of the machine learning portion requesting some number of sequences and waiting for the result for those sequences all at once, the decentralized system allows for multiple robots running in a desynchronized manner such that an arbitrary number of sequences may be tested in parallel, with each robot having a number it is capable of testing at once.

2) Multiple robots of different types participate in the same learning process. The network-based steps can employ a universal format so that the server does not need to know how a given robot implements the experimental process.

3) The machine learning portion no longer requires a robot connected to it to function. If no robots are connected, it can wait until a robot logs on to continue, making the system more stable and consistent while allowing robots to disconnect for repairs.

Figure 12:
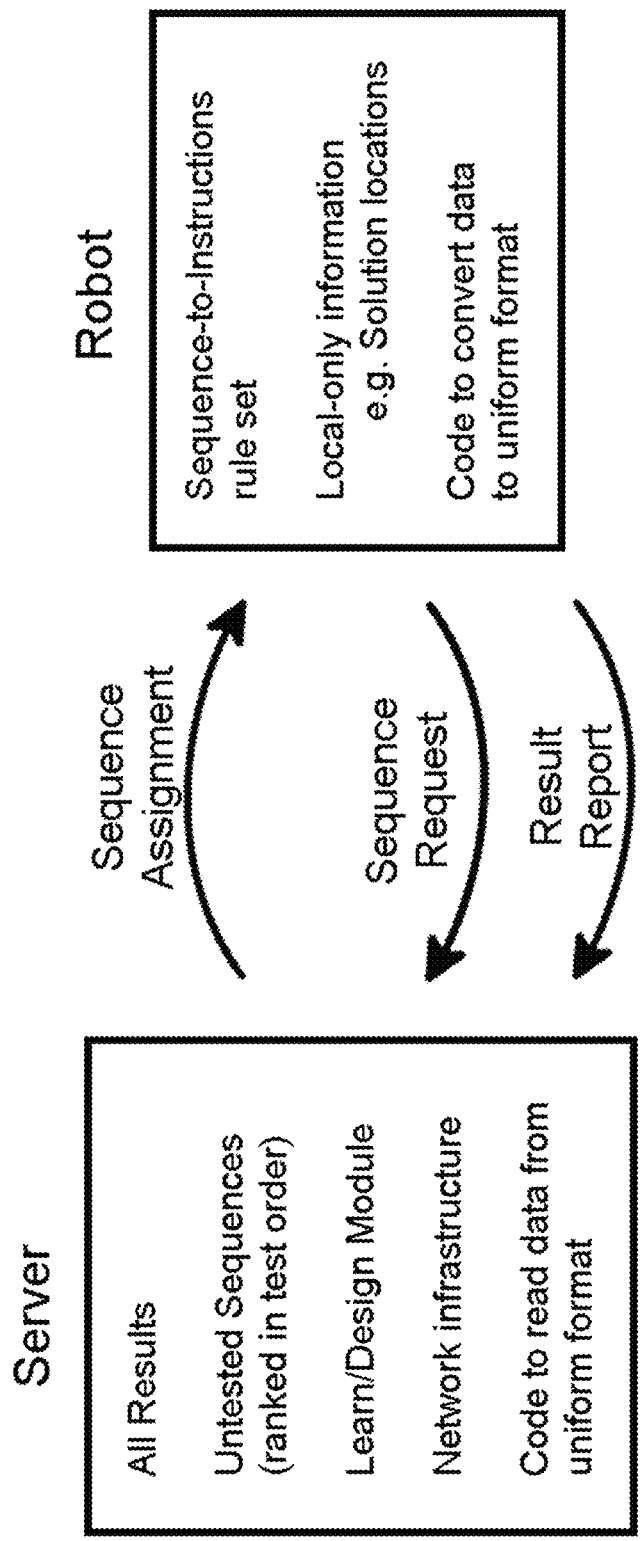
FIG. 12 shows an exemplary general schema and workflow of a decentralized fully automated protein engineering system.

An exemplary general schema and workflow of a decentralized system is shown in FIG. 12 and is described as follows.

The server models all sequences and selects the next to test. Then, assuming its prediction is correct, it updates a temporary hypothetical model and picks the next to test again. Continuing this way, the server generates a ranked list up to a predetermined number of sequences that can be tested at once without additional data.

A robot connects to the server and requests some number n of sequences. For those sequences, the robot will perform the biochemical portion of the cycle as described above. Once complete, the robot will package the data into a format defined by the server rules before sending that packaged data to the server. At this time, the robot may log off or request additional sequences.

The server receives the result(s) from the robot and updates the data set used in generating its model. After the new data are incorporated, it repeats the prediction step described previously and the cycle continues. The specifics of the modeling process are described above.

CITED REFERENCES

Engler C, Kandzia R, Marillonnet S. A one pot, one step, precision cloning method with high throughput capability. PLoS One. 2008; 3(11):e3647.
Li Y, Drummond D A, Sawayama A M, Snow C D, Bloom J D, Arnold F H. A diverse family of thermostable cytochrome P450s created by recombination of stabilizing fragments. Nat Biotechnol. 2007 September; 25(9): 1051-6.
Potapov V, Ong J L, Kucera R B, Langhorst B W, Bilotti K, Pryor J M, Cantor E J, Canton B, Knight T F, Evans T C Jr, Lohman G J S. Comprehensive Profiling of Four Base Overhang Ligation Fidelity by T4 DNA Ligase and Application to DNA Assembly. ACS Synth Biol. 2018 Nov. 16; 7(11):2665-2674.
Voigt C A, Martinez C, Wang Z G, Mayo S L, Arnold F H. Protein building blocks preserved by recombination. Nat Struct Biol. 2002 July; 9(7):553-8.

What is claimed is:

1. A protein engineering system comprising:
   a sequence testing subsystem comprising:
   nucleic acid fragments capable of being combined in different combinations to generate nucleic acids encoding a set of different possible proteins;
   a nucleic acid assembly subsystem that assembles the nucleic acids from the nucleic acid fragments;
   a protein expression subsystem that expresses proteins from the nucleic acids and thereby generates expressed proteins; and
   a property detector subsystem that detects property values of the expressed proteins for a given property and thereby generates detected property values corresponding to the expressed proteins; and
   a machine learning subsystem comprising a server that:
   receives the detected property values from the sequence testing subsystem;
   predicts, from the detected property values received from the sequence testing subsystem, predicted property values for untested proteins, wherein the untested proteins comprise possible proteins in the set that do not have corresponding detected property values;
   selects one or more of the untested proteins based on the predicted property values to thereby generate one or more selected proteins; and
   instructs the sequence testing subsystem to test the one or more selected proteins to obtain a detected property value therefor.

2. The system of claim 1, wherein the sequence testing subsystem further comprises an amplification subsystem that amplifies the nucleic acids.

3. The system of claim 2, wherein the sequence testing subsystem further comprises a robot that:
   combines the nucleic acid fragments in the nucleic acid assembly subsystem;

SEQUENCE LISTING

<160> NUMBER OF SEQ ID NOS: 2

<210> SEQ ID NO 1
<211> LENGTH: 19
<212> TYPE: DNA
<213> ORGANISM: Artificial Sequence
<220> FEATURE:
<223> OTHER INFORMATION: Primer

<400> SEQUENCE: 1
atcccgcgaa attaatacg                                                19

<210> SEQ ID NO 2
<211> LENGTH: 21
<212> TYPE: DNA
<213> ORGANISM: Artificial Sequence
<220> FEATURE:
<223> OTHER INFORMATION: Primer

<400> SEQUENCE: 2
ggatatagtt cctcctttca g                                             21 introduces the nucleic acids to the amplification subsystem;

introduces the nucleic acids to the protein expression subsystem; and introduces the expressed proteins to the property detector subsystem.

4. The system of claim 2, wherein the sequence testing subsystem expresses the proteins from the nucleic acids in the protein expression subsystem after amplifying the nucleic acids in the amplification subsystem without purifying the nucleic acids.

5. The system of claim 1, wherein the sequence testing subsystem:

further comprises a control capable of being combined with a sample of each of the expressed proteins;

splits each sample of the expressed proteins combined with the control into corresponding first and second samples prior to detecting the property values of the expressed proteins; and detects the property value from the expressed protein in each of the first samples, detects a control value in each of the second samples, and normalizes the detected property value from each first sample to the detected control value in each corresponding second sample.

6. The system of claim 1, wherein at least one of the machine learning subsystem predicting the predicted property values and selecting the one or more of the untested proteins comprises modeling at least a subset of the detected property values and the untested proteins in a Gaussian process regression model or employing a multi-armed bandit algorithm.

7. The system of claim 1, wherein at least one of the machine learning subsystem predicting the predicted property values and selecting select the one or more of the untested proteins comprises:

ignoring any detected property values equaling zero when predicting the predicted property values for the untested proteins;

assigning a property value of a predefined non-zero constant to each of the expressed proteins corresponding to a detected property value of zero when predicting the predicted property values for the untested proteins;

restricting the selected proteins to a set of the untested proteins having a predicted property value greater than a predefined threshold; or predicting a predicted property likelihood for each of the possible proteins in the set, minimum-subtracting an upper confidence bound in an upper confidence bound algorithm or a predicted property value in a Thompson sampling algorithm to generate a minimum-subtracted value for each of the possible proteins in the set, multiplying each minimum-subtracted value by each predicted property likelihood to generate a product for each of the possible proteins in the set, and employing the product as an upper confidence bound or distribution mean for selecting the one or more of the untested proteins.

8. The system of claim 1, wherein the number of the different possible proteins in the set is greater than 200, and all of the possible proteins in the set comprise amino acid sequences that have at least 60% sequence identity to each other.

9. The system of claim 1, further comprising separately contained sets of the nucleic acid fragments, wherein each nucleic acid fragment in each set of nucleic acid fragments is identical or encodes an identical amino acid sequence.

10. The system of claim 9, wherein:

the nucleic acid fragments within each set of nucleic acid fragments are configured not to be mutually assembled together with the nucleic acid assembly subsystem;

the nucleic acid fragments in each set of nucleic acid fragments are configured to assemble with the nucleic acid fragments in each of at least a first two other of the sets of nucleic acid fragments; and the nucleic acid fragments in each set of nucleic acid fragments are configured not to assemble with the nucleic acid fragments in each of at least a second two other of the sets of nucleic acid fragments.

11. The system of claim 1, wherein the nucleic acid fragments are configured to assemble in different ordered combinations.

12. The system of claim 1, wherein the nucleic acid fragments are configured to assemble the nucleic acids using from 3 to 30 nucleic acid fragments per nucleic acid.

13. The system of claim 1, wherein each nucleic acid fragment is from 10 to 600 bases in length.

14. The system of claim 1, wherein the nucleic acid fragments are configured to assemble the nucleic acids using from 2 to 30 assembly points.

15. The system of claim 1, wherein at least one of the nucleic acid fragments overlaps an assembly point of at least one other of the nucleic acid fragments.

16. The system of claim 1, wherein the sequence testing subsystem comprises multiple sequence testing subsystems, each of the multiple sequence testing subsystems comprising its own independent nucleic acid assembly subsystem, protein expression subsystem, and property detector subsystem.

17. The system of claim 1, wherein:

the number of the different possible proteins in the set is greater than 200, and all of the possible proteins in the set comprise amino acid sequences that have at least 60% sequence identity to each other;

the system further comprises separately contained sets of the nucleic acid fragments, wherein each nucleic acid fragment in each set of nucleic acid fragments is identical or encodes an identical amino acid sequence;

the nucleic acid fragments within each set of nucleic acid fragments are configured not to be mutually assembled together with the nucleic acid assembly subsystem, the nucleic acid fragments in each set of nucleic acid fragments are configured to assemble with the nucleic acid fragments in each of at least a first two other of the sets of nucleic acid fragments, and the nucleic acid fragments in each set of nucleic acid fragments are configured not to assemble with the nucleic acid fragments in each of at least a second two other of the sets of nucleic acid fragments;

the nucleic acid fragments are configured to assemble in different ordered combinations;

the nucleic acid fragments are configured to assemble the nucleic acids using from 3 to 30 nucleic acid fragments per nucleic acid;

each nucleic acid fragment is from 10 to 600 bases in length;

the nucleic acid fragments are configured to assemble the nucleic acids using from 2 to 30 assembly points; and at least one of the nucleic acid fragments overlaps an assembly point of at least one other of the nucleic acid fragments.

18. The system of claim 1, wherein the sequence testing subsystem tests the one or more selected proteins to obtain a detected property value therefor.

19. A method of protein engineering, comprising:
in a sequence testing subsystem:
  assembling, in a nucleic acid assembly subsystem, nucleic acids from nucleic acid fragments to generate nucleic acids encoding a set of different possible proteins;
  expressing, in a protein expression subsystem, proteins from the nucleic acids to thereby generate expressed proteins;
  detecting, in a property detector subsystem, property values of the expressed proteins; and
  determining, in a machine learning subsystem, all possible nucleic acid sequences of the nucleic acids capable of being assembled from the nucleic acid fragments, thereby generating detected property values corresponding to the expressed proteins; and
in a machine learning subsystem:
  receiving the detected property values from the sequence testing subsystem;
  predicting, from the detected property values received from the sequence testing subsystem, predicted property values for untested proteins, wherein the untested proteins comprise possible proteins in the set that do not have corresponding detected property values;
  selecting one or more of the untested proteins based on the predicted property values to thereby generate one or more selected proteins; and
  instructing the sequence testing subsystem to test the one or more selected proteins to obtain a detected property value therefor,
wherein each of the assembling, the expressing, the detecting, the determining, the receiving, the predicting, the selecting, and the instructing are performed in an automated, computer-controlled system.

20. The method of claim 19, further comprising testing in the sequence testing subsystem the one or more selected proteins instructed by the machine learning subsystem to obtain a detected property value therefor.

* * * * *